US009692060B2

(12) United States Patent
Chokai et al.

(10) Patent No.: US 9,692,060 B2
(45) Date of Patent: Jun. 27, 2017

(54) PARTICULATE CARBON CATALYST INCLUDING NITROGEN AND METAL AND METHOD FOR PRODUCING THE SAME

(75) Inventors: Masayuki Chokai, Tokyo (JP); Nobuaki Kido, Yamaguchi (JP); Yuta Nabae, Tokyo (JP); Masa-aki Kakimoto, Tokyo (JP); Seizo Miyata, Tokyo (JP)

(73) Assignees: TEIJIN LIMITED, Osaka (JP); TOKYO INSTITUTE OF TECHNOLOGY, Tokyo (JP)

( * ) Notice: Subject to any disclaimer, the term of this patent is extended or adjusted under 35 U.S.C. 154(b) by 250 days.

(21) Appl. No.: 14/119,528

(22) PCT Filed: May 21, 2012

(86) PCT No.: PCT/JP2012/063572
§ 371 (c)(1),
(2), (4) Date: Nov. 22, 2013

(87) PCT Pub. No.: WO2012/161335
PCT Pub. Date: Nov. 29, 2012

(65) Prior Publication Data
US 2014/0087289 A1    Mar. 27, 2014

(30) Foreign Application Priority Data
May 23, 2011 (JP) .................................. 2011-115016

(51) Int. Cl.
*H01M 4/88* (2006.01)
*H01M 4/90* (2006.01)
(Continued)

(52) U.S. Cl.
CPC ......... *H01M 4/9091* (2013.01); *B01J 37/084* (2013.01); *B82Y 30/00* (2013.01); *C01B 31/10* (2013.01); *H01M 4/90* (2013.01); *H01M 4/96* (2013.01); *C01P 2004/61* (2013.01); *C01P 2004/62* (2013.01); *C01P 2004/64* (2013.01);
(Continued)

(58) Field of Classification Search
CPC ......... H01M 4/90; H01M 4/96; H01M 4/9091
USPC ........ 429/523, 527, 532, 535; 502/180, 182, 502/185, 9
See application file for complete search history.

(56) References Cited

U.S. PATENT DOCUMENTS 3,755,193 A    8/1973  Luft et al.
2011/0143253 A1  6/2011  Miyata et al.

FOREIGN PATENT DOCUMENTS

EP    2298442 A1    3/2011
JP    S47021388    10/1972
(Continued)

OTHER PUBLICATIONS

Jaouen et al., Oxygen Reduction Catalysts for Polymer Electrolyte Fuel Cells from the Pyrolysis of Iron Acetate Adsorbed on Various Carbon Supports, 2003, Journal of Physical Chemistry B, 107, 1376-1386.*
(Continued)

*Primary Examiner* — Sean P Cullen
(74) *Attorney, Agent, or Firm* — Sughrue Mion, PLLC

(57) ABSTRACT

A particulate carbon catalyst in which particles having a particle diameter of 20 nm-1 μm account for a volume fraction of at least 45%, and the content of nitrogen atoms is 0.1-10 atomic % relative to the amount of carbon atoms.

10 Claims, 7 Drawing Sheets

(51) Int. Cl.
| | |
|---|---|
| H01M 4/92 | (2006.01) |
| H01M 4/96 | (2006.01) |
| B01J 37/08 | (2006.01) |
| B82Y 30/00 | (2011.01) |
| C01B 31/10 | (2006.01) |
| H01M 4/86 | (2006.01) |
| H01M 8/1018 | (2016.01) |

(52) U.S. Cl.
 CPC ............ *H01M 2004/8689* (2013.01); *H01M 2008/1095* (2013.01)

(56) References Cited

FOREIGN PATENT DOCUMENTS

| | | |
|---|---|---|
| JP | H07033420 A | 2/1995 |
| JP | H08162096 A | 6/1996 |
| JP | H09301089 A | 11/1997 |
| JP | H11140181 A | 5/1999 |
| JP | 2004330181 A | 11/2004 |
| JP | 2004-362802 A | 12/2004 |
| JP | 2006331846 A | 12/2006 |
| JP | 2007026746 A | 2/2007 |
| JP | 2007207662 A | 8/2007 |
| JP | 2007220414 A | 8/2007 |
| JP | 2009291706 A | 12/2009 |
| JP | 2009291707 A | 12/2009 |
| JP | 2009291714 A | 12/2009 |
| JP | 2010-92690 A | 4/2010 |
| JP | 2010184906 A | 8/2010 |
| JP | 2010-275140 A | 12/2010 |
| WO | 2006003831 A1 | 1/2006 |

OTHER PUBLICATIONS

Maria Perez-Cadenas et al, "Surface Chemistry, Porous Texture, and Morphology of N-Doped Carbon Xerogels", Langmuir, vol. 25, No. 1, 2009, pp. 466-470.
Wu, Gang et al., "Synthesis of nitrogen-doped onion-like carbon and its use in carbon-based CoFe binary non-precious-metal catalysts for oxygen-reduction", Carbon, vol. 49, No. 12, 2011, pp. 3972-3982.
Li, Fengbo et al., "Nitrogen-doped porous carbon microspherules as supports for preparing monodisperse nickel nanoparticles", Carbon, vol. 44, No. 1, 2006, pp. 128-132.
Nabae, Yuta et al., RETRACTED: The Role of Fe Species in the Pyrolysis of Fe Phthalocyanine and Phenolic Resin for Preparation of Carbon-based Cathode Catalysts, Carbon, 2010, vol. 48, No. 9, pp. 2613-2624.
Communication dated Oct. 20, 2014 from The European Patent Office in counterpart European Patent Application No. 12789926.8.
Communication dated Nov. 14, 2014 from The European Patent Office in counterpart European Patent Application No. 12789926.8.
Takashi Ikeda et al., Carbon Alloy Catalysts: Active Sites for Oxygen Reduction Reaction, The Journal of Physical Chemistry C., 2008, 112, pp. 14706-14709.
Hideharu Niwa et al., X-ray Absorption Analysis of Nitrogen Contribution to Oxygen Reduction Reaction in Carbon Alloy Cathode Catalysts for Polymer Electrolyte Fuel Cells, Journal of Power Sources, 2009, 187, pp. 93-97.
Gang Liu et al., Stability Study of Nitrogen-Modified Carbon Composite Catalysts for Oxygen Reduction Reaction in Polymer Electrolyte Membrane Fuel Cells, ECS Transactions, 2009, 25, 1, pp. 1251-1259.
Takashi Watanabe et al., Nitrogen Removal and Carbonization of Polyacrylonitrile with Ultrafine Metal Particles at Low Temperatures, Carbon, 1994, vol. 32, No. 2, pp. 329-334.
Libin Wu et al., Retraction for Chemical Communications: Pt-free Cathode Catalysts Prepared via Multi-step Pyrolysis of Fe Phthalocyanine and Phenolic Resin for Fuel Cells, Chem. Commun., 2010, 46, pp. 6377-6379, Retraction published Apr. 17, 2013.
Yayoi Yoshioka et al., Preparation of Aromatic Polyamide Particles with Trifluoromethyl Groups, Polymer Preprints, Japan, 2010, vol. 59, No. 2, p. 2898.
Yayoi Yoshioka et al., Preparation of Pie-Shaped and Rugged Aromatic Polyamide Particles, Macromolecular Reaction Engineering, 2008, 2, pp. 407-413.
Yiwen Chu et al., Synthesis of Monodispersed Co(Fe)/Carbon Nanocomposite Microspheres with Very High Saturation Magnetization, Journal of Physical Chemistry C., 2009, 113, pp. 4047-4052.
Yuta Nabae et al., The Role of Fe Species in the Pyrolysis of Fe Phthalocyanine and Phenolic Resin for Preparation of Carbon-based Cathode Catalysts, Carbon, 2010, vol. 48, No. 9, pp. 2613-2624.
International Search Report for PCT/JP2012/063572 dated Jul. 3, 2012.
Third Party Observation dated Jul. 17, 2015 from the European Patent Office in counterpart European Application No. 12789926.8.
Jun-ichi Ozaki et al., "Simultaneous doping of boron and nitrogen into a carbon to enhance its oxygen reduction activity in proton exchange membrane fuel cells", Letters to the Editor I Carbon 44 (2006), pp. 3358-3361 (4 pages total) doi: 10.1016/j.carbon.2006.08.022.
Jun-ichi Ozaki et al., "Enhancement of oxygen reduction activity by carbonization of furan resin in the presence of phthalocyanines", Letters to the Editor I Carbon 44 (2006), pp. 1324-1326 (3 pages total) doi: 10.1016/j.carbon.2005.12.026.
Communication dated Jan. 19, 2016, issued by the European Patent Office in corresponding European Application No. 12 789 926.8.

\* cited by examiner

PARTICULATE CARBON CATALYST INCLUDING NITROGEN AND METAL AND METHOD FOR PRODUCING THE SAME

CROSS REFERENCE TO RELATED APPLICATIONS

This application is a National Stage of International Application No. PCT/JP2012/063572 filed May 21, 2012 (claiming priority based on Japanese Patent Application No. 2011-115016, filed May 23, 2011), the contents of which are incorporated herein by reference in their entirety.

FIELD OF THE INVENTION

The present invention relates to a particulate carbon catalyst and a method for producing the same, more particularly to a particulate carbon catalyst suitable for a use as an oxygen reduction reaction catalyst for an electrode of a polymer electrolyte fuel cell and a method for producing the same.

BACKGROUND ART

A polymer electrolyte fuel cell (sometimes abbreviated as PEFC hereafter) is highly expected to be used for a fuel cell vehicle (FCV), a stationary cogeneration system (CG-FC), etc., as it enables generation of electricity with high efficiency at a relatively low temperature.

As a catalyst used as an electrode for the polymer electrolyte fuel cell, a platinum catalyst has been used because of its high performance. However, the platinum catalyst is one of major constrictive conditions against prevalence of the polymer electrolyte fuel cell due to its limited source and high price. Especially, there is a serious problem that platinum tends to elute out from the platinum catalyst because the positive electrode (often referred to as air electrode or oxygen electrode) is surrounded by strong oxidative atmosphere due to oxygen reduction reaction when the platinum catalyst is used for the positive electrode of the polymer electrolyte fuel cell.

Therefore, extensive research and development are being done seeking the catalyst for the electrode of polymer electrolyte fuel cell which does not require expensive noble metals such as platinum (sometimes referred to as non-platinum catalyst hereafter), not only in Japan but also around the world especially in the United States.

Among such non-platinum catalysts, use of oxides and nitrides of non-platinum metals such as tantalum, zirconium, etc. has been proposed. Furthermore, carbon catalysts containing nitrogen or boron have been studied as the substantially non-metal carbon catalyst for a long time (Patent Document 1 through Patent Document 7).

For example, Patent Document 4 discloses a carbon catalyst composed of the mass of many carbon particles having a shell structure of the average diameter of 10 to 20 nm in a non-aggregated state and the effective existence ratio of nitrogen atoms in the catalyst. Patent document 5 discloses the effective existence state of nitrogen atoms in the carbon catalyst. Patent Document 6 discloses the effective existence ratio of oxygen atoms in the carbon catalyst. Various studies have been done regarding the role of nitrogen atoms in the carbon catalyst (Patent Document 7) and the reaction mechanisms have been proposed.

In addition, it has recently been reported that the carbon atoms near the nitrogen atoms at the terminus of graphite are the active sites of oxygen reduction reaction in, for example, Non-Patent Documents 1 to 3. It has also been reported that elimination of nitrogen and progress of graphite formation are promoted by the presence of metal upon carbonization of an organic polymeric material, as shown in Non-Patent Document 4.

Non-Patent Document 5 reports that a catalyst having a high catalyst activity is obtained by heat treatment of a composition of phenolic resin and iron phthalocyanine in two or more stages in combination with acid treatment after each heat treatment.

However, it is assumed that pulverization of block object is required to produce the carbon catalyst as mentioned above. Although various pulverization techniques which may enable considerable miniaturization have been proposed, this step must be incorporated in the manufacturing process, causing the cost increase in the production of the carbon catalyst. In addition, it is concerned that a surface with different catalyst property has been formed due to the appearance of a new surface by pulverization.

On the other hand, when the carbon catalyst is used as a catalyst for the air electrode of PEFC, i.e., as an oxygen reduction reaction catalyst, although the preferred reaction at the electrode is a four-electron reduction reaction of oxygen,

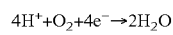

a two-electron reduction reaction

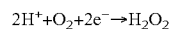

may proceed as a side reaction generating hydrogen peroxide in some cases. When the two-electron reduction reaction proceeds in a high proportion, not only the electricity generating property of the fuel cell decreases, but also hydrogen peroxide generated at the electrode adversely affects the fuel cell system. Therefore, the catalyst having a high efficiency in the four-electron reduction reaction is desired.

From these standpoints, presence of a plurality of surfaces on the catalyst which are different in catalyst properties will cause problems of quality control in producing a carbon catalyst having a uniform catalyst property.

CITATION LIST

Patent Document

[Patent Document 1] Japanese Patent Laid-Open Publication No.S47-21388
[Patent Document 2] Japanese Patent Laid-Open Publication No.2004-330181
[Patent Document 3] Japanese Patent Laid-Open Publication No.2006-331846
[Patent Document 4] Japanese Patent Laid-Open Publication No.2007-207662
[Patent Document 5] Japanese Patent Laid-Open Publication No.2009-291706
[Patent Document 6] Japanese Patent Laid-Open Publication No.2009-291707
[Patent Document 7] Japanese Patent Laid-Open Publication No.2007-26746

Non-Patent Document

[Non-patent Document 1] J. Phys. Chem. C112 (2008) p. 14706-14709
[Non-patent Document 2] J. Power Sources 187 (2009) p. 93-97

[Non-patent Document 3] ECS Trans. 25 (2009) p. 1251-1259
[Non-patent Document 4] Carbon, 32 (1994) p. 329-334
[Non-patent Document 5] Chem. Commun., 46 (2010) p. 6377-6379

DISCLOSURE OF THE INVENTION

Problems to be Solved by the Invention

The present invention aims at providing a particulate carbon catalyst suitable as a catalyst for the electrode, especially as an oxygen reduction reaction catalyst for an air electrode of a polymer electrolyte fuel cell which does not require the use of expensive noble metals such as platinum and a method for producing the same.

More particularly, the present invention aims at providing a particulate carbon catalyst having an appropriate particle size which can suitably realize proton transfer from the electrolyte membrane and gas diffusion that are required for the use as the electrode catalyst of a polymer electrolyte fuel cell and the effective method for producing the same.

Means for Solving the Problem

As a result of extensive investigation to solve the above-mentioned problem, the present inventors have found that a particulate carbon catalyst in which the particles having a particle diameter of 20 nm or more and 1 μm or less account for a volume fraction of at least 45% and the content of nitrogen atoms relative to carbon atoms is 0.1 atomic % or more and 10 atomic % or less has an appropriate particle size which makes it possible to suitably realize efficiency of proton transfer from the electrolyte membrane and gas diffusion at the electrode of polymer electrolyte fuel cell, wherein an excellent oxygen reduction reaction activity is exhibited, completely eliminating a need to use an expensive platinum and thus completed the present invention.

The present inventors have also found that the above-mentioned particulate carbon catalyst can be suitably produced by carbonizing a particulate precursor composition containing nitrogen atoms and an organic polymer, wherein the particles having a particle diameter of 20 nm or more and 2 μm or less account for a volume fraction of at least 35%, and thus completed the invention regarding to the method for producing the above-mentioned particulate carbon catalyst.

The present inventors have also found that a particulate carbon catalyst having a spherical shape restricts the appearance of a new surface, especially facilitates the four-electron reaction, and reduces generation of hydrogen peroxide which is harmful in the oxygen reduction reaction, compared with a pulverized catalyst having an irregularly shaped surface, and thus completed the invention of a spherical particulate carbon catalyst and the production thereof using a spherical precursor composition.

Advantage of the Invention

The present invention provides the particulate carbon catalyst having the oxygen reduction reaction activity effective for the proton transfer efficiency from the electrolyte membrane and gas diffusion used as a cathode for a polymer electrolyte fuel cell without using a platinum catalyst. In addition, according to the method for producing the particulate carbon catalyst of the present invention, the particulate carbon catalyst can be efficiently produced without undergoing the pulverization step which was required in a previous method to produce the particulate carbon catalyst. Furthermore, design of the catalyst having a homogeneous catalyst property has become possible because a new catalyst surface, which is inevitably generated by pulverization, is scarcely generated according to the present method, which is very advantageous in quality control for practical application and mass production of the catalyst.

BEST MODE FOR CARRYING OUT THE INVENTION

Figure 1:
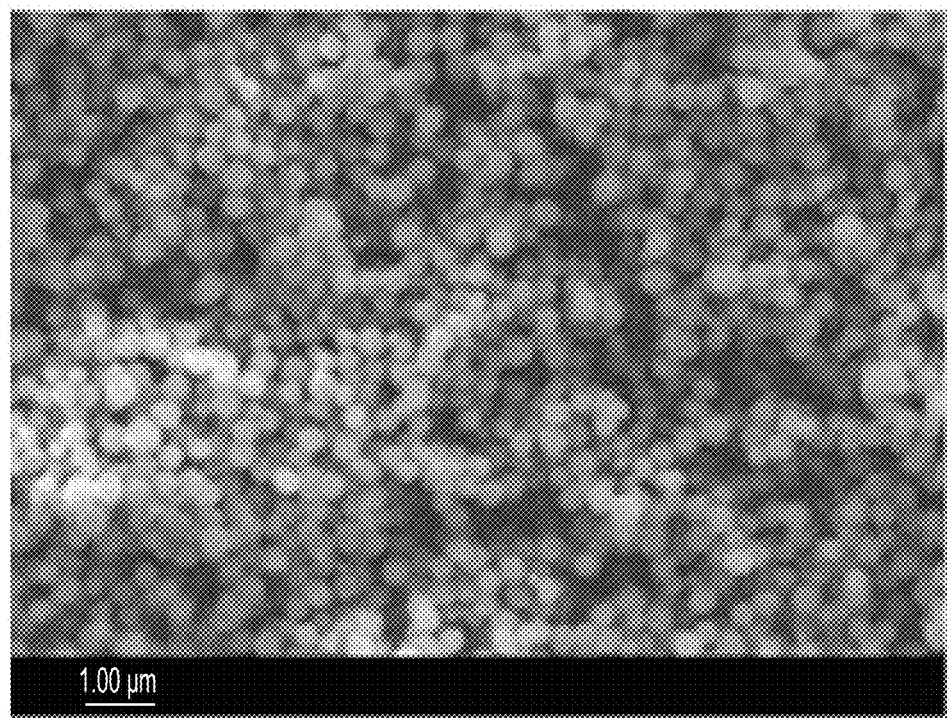
FIG. 1 is an SEM image (photograph) of polyamic acid particles obtained in Reference Example 1.

Hereinafter, the embodiments to practice the present invention will be described.

<Particulate Carbon Catalyst>

The particulate carbon catalyst of the present invention comprises the particles having a particle diameter of 20 nm or more and 1 μm or less and accounting for a volume fraction of at least 45%, wherein the content of nitrogen atoms relative to carbon atoms is 0.1 atomic % or more and 10 atomic % or less.

The above-mentioned volume fraction of the particles refers to the volume fraction obtained by measuring the particle size distribution of the particulate carbon catalyst by laser diffraction particle size distribution measurement. It should be noted that the measurement should be performed under the conditions of a dispersed state as much as possible, because the results of the laser diffraction particle size distribution measurement vary depending on the degree of particle dispersion, among other factors. As for the method of dispersion, although conventionally known dispersion apparatus such as ultrasonic apparatus and ball mill may be used, it is preferable that the catalyst particles formed do not accompany a large shape change due to dispersing. The large shape change means, for example, that the spherical particles split into semispherical, and the like.

As for the particulate carbon catalyst of the present invention, the volume fraction of the particles having a particle diameter of 20 nm or more and 1 µm or less is at least 45%, higher volume fraction being preferable from a viewpoint of the catalyst activity, 50% or more being preferable and 55% or more being more preferable. It should be noted that the particulate carbon catalyst in which the volume fraction of the particles having a particle diameter of 20 nm or more and 1 µm or less is less than 45% is not preferable, because the specific surface area of the aggregated particles is small, resulting in a decrease in the catalyst efficiency. Although the upper limit of the volume fraction of the particles having a particle diameter of 20 nm or more and 1 µm or less in the particulate carbon particles of the present invention is naturally 100%, it is preferable that the volume fraction be about 98% from a viewpoint of easiness of preparation.

It is required that the content of nitrogen atoms relative to carbon atoms be 0.1 atomic % or more and 10 atomic % or less, in order that the particulate carbon catalyst of the present invention exerts its catalyst action, because the presence of nitrogen atom is essential for the catalyst action. As for the content of nitrogen atoms, the element ratio measured by ordinary element analysis may be used. If the content of nitrogen atoms relative to carbon atoms is less than 0.1 atomic %, the catalyst action is not sufficient, resulting in difficulties in the use as a useful particulate carbon catalyst. The content of nitrogen atoms relative to carbon atoms is preferably 0.2 atomic % or more, more preferably 0.5 atomic % or more. Inversely, if the content of nitrogen atoms relative to carbon atoms is more than 10 atomic %, electron conduction within the catalyst tends to be hindered due to poor graphite formation because the catalyst should be produced at relatively low temperature. Therefore, it is concerned that the performance as the fuel cell electrode may be damaged even if the catalyst having a high catalyst property is obtained. The content of nitrogen atoms relative to carbon atoms in the catalyst of the present invention is preferably less than 9 atomic %, and more preferably less than 8 atomic %. It should be noted that the above-mentioned content of nitrogen atoms relative to carbon atoms represented by the atomic ratio may be referred to as nitrogen/carbon atomic ratio or N/C ratio.

It is preferable that the shape of the particulate carbon catalyst of the present invention be spherical. The spherical carbon catalyst has a large bulk density, resulting in an easy handling property when making the catalyst dispersion for production of the electrode. As for the measure of the spherical shape, the average value of sphericity represented by the following equation may be suitably used. Since it is difficult to strictly measure the three-dimensional shape of fine particles, the sphericity T may be determined from a planar image of particles observed using a scanning electron microscope (SEM) and the like, in terms of the length, circumferential length, area, etc. of the particles which may be measured by image processing and the like, representing the particle shape.

$$\text{Sphericity } T = 4\pi S/L^2$$

(wherein L is circumferential length of the particle on the image, S is area of the particle on the image, and $\pi$ is circumference ratio.)

Although the sample number, i.e., the number of particles with which the average value of sphericity is calculated, should be as large as possible, it is sufficient to randomly select 10 particles and determine the sphericity as mentioned above.

The sphericity of the particulate carbon catalyst of the present invention is preferably 0.65 or more, more preferably 0.75 or more, and even more preferably 0.8 or more. If the sphericity is less than 0.65, the bulk density is too large, possibly causing poor fluidity of the dispersed region when the electrode is prepared. Although the upper limit of the sphericity of the particulate carbon catalyst of the present invention is naturally 1, it is preferable that the sphericity be about 0.95 from a viewpoint of easiness of preparation.

The content of metal atoms in the particulate carbon catalyst of the present invention is preferably 0.1 or less by mass ratio relative to carbon atoms. By using the particulate carbon catalyst with such low metal content for the electrode of the fuel cell, degradation of the electrolyte of the fuel cell can be prevented, because side reactions by the metal, such as generation of hydrogen peroxide and generation of hydroxyl radical, are not likely to proceed. Although the lower limit of the metal content is not strictly determined, the operation will be troublesome if an attempt will be made to completely remove the metal component to the undetectable level in producing the carbon catalyst. Considering such circumstances, the mass ratio of metal atoms relative to carbon atoms in the particulate carbon catalyst of the present invention is preferably 0.001 or more.

Although various known metals may be used as the above-mentioned metal atoms, representative examples include one or more metals selected from the group consisting of iron, cobalt, nickel, copper, tin, manganese, and zinc, which may be added during the production process in order to obtain a highly active particulate carbon catalyst as will be described later.

<Production Method of Particulate Carbon Catalyst>

The production method of the present invention is a method for producing the above-mentioned particulate carbon catalyst by carbonizing a particulate precursor composition containing nitrogen atoms and an organic polymer, wherein the particles having an average particle diameter of 20 nm or more and 2 µm or less account for a volume fraction of at least 35%. The above-mentioned particulate precursor composition containing nitrogen atoms and an organic polymer refers to a mixture of an organic polymer not having nitrogen atoms and a nitrogen-containing low molecular weight compound, a mixture of an organic polymer having nitrogen atoms and a nitrogen-containing low molecular weight compound, a mixture of an organic polymer not having nitrogen atoms and an organic polymer having nitrogen atoms, an organic polymer having nitrogen atoms, and so on. The particulate precursor composition may include two or more kinds of the above-mentioned organic polymer and the nitrogen-containing low molecular weight compound. As for the particulate precursor composition used in the production method of the present invention, the volume fraction of the particles having a particle diameter of 20 nm or more and 2 µm or less is at least 35%, a higher volume fraction being preferable from a viewpoint of the activity of the catalyst obtained, 40% or more being preferable and 55% or more being more preferable. The upper limit of the volume fraction is preferably 100%.

It is preferable that the particulate precursor composition used in the method for producing the particulate carbon catalyst of the present invention contains a metal compound, the metal compound preferably being a transition metal compound, more preferably being one or more kinds selected from the group consisting of an iron compound, a cobalt compound, a copper compound, a tin compound, a manganese compound, and a zinc compound.

Although the specific kind of the metal compound and the method to add the particulate precursor composition will be discussed later in detail, the organic polymer itself may contain a metal element and the nitrogen-containing low molecular weight compound may contain a metal element. For example, an organic polymer containing nitrogen atoms such as polyacrylonitrile is itself a particulate precursor composition containing nitrogen atoms and an organic polymer. In addition, an organic polymer containing nitrogen atoms and metal atoms such as hyper branch-type metal phthalocyanine is itself a particulate precursor composition containing nitrogen atoms, an organic polymer, as well as a metal compound.

In addition, the particulate precursor composition may contain a component other than the above-mentioned, unless it causes any trouble in obtaining the particulate carbon catalyst of the present invention.

As the average particle diameter of the particulate precursor composition, the average value of diameters of a plurality of particles obtained from an observation result of the particulate precursor composition using a scanning electron microscope (sometimes abbreviated as SEM hereafter) may be used. As the diameter in this case, the maximum diameter (the distance at which the length of line formed by a pair of parallel lines holding the particulate precursor becomes maximum) may also be used.

<<Organic Polymer>>

As the organic polymer contained in the particulate precursor composition used in the production method of the present invention, one or more kinds selected from the group consisting of conventionally known polymeric materials, for example, such as a phenolic resin, a furan resin, an unsaturated polyester resin, an epoxy resin, an urea resin, a melamine resin, a polyurethane, a thermosetting polyimide; polyolefin-based polymeric materials such as a polyethylene, a polystyrene, a polypropylene, a polyvinyl chloride, a polyacrylonitrile; other organic polymers such as a polyester, a polyether, a polycarbonate, a polyetherketone, a polysulfide, a polyamide, a polyamic acid, a polyimide, a polyamideimide, a polyamide ether, a polyamide ester, a polyimide ester, a polyimide ether, a polyazole, a ladder polymer, as well as a hyper branch-type organic polymer may be used.

However, if the organic polymer used does not contain nitrogen atoms, the particulate precursor composition to be carbonized should contain a nitrogen-containing low molecular weight compound as a nitrogen source. Therefore, among the above-mentioned organic polymers, one containing nitrogen atoms may be preferably used as the particulate precursor composition in order to introduce nitrogen atoms to the particulate carbon catalyst, because it serves as the nitrogen atom source by itself. As such an organic polymer containing nitrogen atoms, one or more kinds selected from the group consisting of a thermosetting organic polymer such as an urea resin, a melamine resin, a polyurethane, a thermosetting polyimide, etc.; an organic polymer capable of addition polymerization such as acrylonitrile, methacrylonitrile, acryl amide, vinyl carbazole, vinyl phthalimide and a copolymer thereof; and a condensation-type organic polymer such as a polyamide, a polyamic acid, a polyimide, a polyamideimide, a polyamide ether, a polyamide ester, a polyimide ester, a polyimide ether, a polyazole, and the like may be exemplified. Although the above-mentioned organic polymer may be a copolymer, it is preferable that the content of the repeat unit which does not contain nitrogen atoms be less than 50 mol %, for example, the content of the polystyrene unit in polyacrylonitrile-polystyrene copolymer be less than 50 mol %.

Among these organic polymers, it is preferable to use an organic polymer which especially facilitates production of the particulate precursor composition in which the particles having an average particle diameter of 20 nm or more and 2 μm or less account for a volume fraction of at least 35%. As such an organic polymer, one or more kinds selected from the group consisting of condensation polymers such as polyamides including para-type aromatic polyamides such as a poly-p-phenyleneterephthalamide, meta-type aromatic polyamides such as a poly-m-phenyleneisophthalamide, copolymer-type aromatic polyamides such as a copoly-p-phenylene-3,4'-oxydiphenylene terephthalamide; a polyamic acid, composed of a polymer of an aromatic diamine such as p-phenylenediamine, m-phenylenediamine, 4,4'-oxyphenylenediamine together with a tetracarboxylic acid such as pyromellitic acid, 3,4,3',4'-biphenylenetetracarboxylic acid or an acid anhydride thereof; a polyimide, a polyamideimide, a polyamide ether, a polyamide ester, a polyimide ester, a polyimide ether; polyazoles such as a polybenzoxazole, a polybenzimidazole, a polybenzthiazole; a ladder polymer composed of a polymer of a tetramine such as 3,3'-diaminobenzidine, 1,2,4,5-tetraaminobenzene, 2,3,5,6-tetraaminopyridine or a strong acid salt and/or hydrate thereof with a tetracarboxylic acid such as pyromellitic acid, 3,4,3',4'-biphenylenetetracarboxylic acid or an acid anhydride thereof (also referred to as polybenzimidazopyrrolone); an electroconductive polymer such as a polyaniline, a polypyrrole, etc.; a polyacrylonitrile and a copolymer thereof may be exemplified.

In the production method of the present invention, polyacrylonitrile copolymer which is used as the organic polymer contained in the particulate precursor composition preferably contains 50 mass % or more, more preferably 70 mass % or more, and even more preferably 90 mass % or more of acrylonitrile residue in the total repeat unit constituting the polymer chain, or acrylonitrile content in the total raw material monomer. As a monomer copolymerizable with acrylonitrile, one or more kinds selected from the group consisting of methacrylonitrile, acrylamide, acrylic acid, an alkyl acrylate, methacrylic acid, an alkyl methacrylate, itaconic acid, an alkyl itaconate, aminostyrene, vinyl pyridine, vinyl imidazole, vinyl carbazole, vinyl pyrrolidone, an alkyl cyanoacetate, vinyl phthalimide, vinyl pyradine, vinyl triazines and vinyl ethers, allylsulfonic acid, methallylsulfonic acid, an alkyl allylsulfonate, and an alkyl methallylsulfonate may be exemplified. As the alkyl ester in the above-mentioned copolymerizable monomer, an alkyl ester having 1 to 6 carbon atoms is preferable. The above-mentioned various organic acids, such as acrylic acid, etc., may be an organic salt compound such as alkali metal salt and ammonium salt.

In addition, one or more kinds selected from group consisting of a metal-containing organic polymer such as hyper branch iron phthalocyanine, hyper branch cobalt phthalocyanine, hyper branch nickel phthalocyanine, which are condensation products of a diphthalonitrile compound such as 4,4'-(1,3-phenylenebis(oxy))diphthalonitrile, 4,4'-(1,4-phenylenebis(oxy))diphthalonitrile, 4,4'-(4,4'-biphenylenebis(oxy))diphthalonitrile, 4,4'-(4,4'-hexafluoroisopropylidenebiphenylenebis (oxy))diphthalonitrile with a metal halide such as iron (II) chloride, iron (II) bromide, cobalt (II) chloride, cobalt (II) bromide, nickel (II) chloride, nickel (II) bromide may be used.

As a method for producing the particles in which the particles having an average particle diameter of 20 nm or more and 2 μm or less account for a volume fraction of at least 35%, conventionally known polymerization method, such as, for example, those disclosed in Japanese Patent Laid-Open Publication No. H9-301089, Japanese Patent Laid-Open Publication No. H11-140181, Polymer Preprints, Japan, Vol.59, No.2 (2010) p. 2898, and Macromol. React. Eng., 2008, 2, p. 407-413, etc. may be used. The following method may be exemplified in polymerization of aromatic polyamic acid and aromatic polyimide.

Polyamic acid having the above-mentioned particle diameter may be obtained by polymerization in an organic solvent in which aromatic tetracarboxylic dianhydride and aromatic diamine are soluble but polyamic acid formed by the reaction is insoluble. Physical dispersion treatment such as stirring and ultrasonic sonication may be utilized during the reaction. In addition, the particle diameter may be adjusted by controlling the solubility by adding an additive such as acid and base to the solvent used in the polymerization. The aromatic polyimide having the above-mentioned particle diameter may be obtained by heat treatment of the polyamic acid obtained.

As an addition polymerization type polymer which may be produced in particle shape in which particles having a particle diameter of 20 nm or more and 2 μm or less account for a volume fraction of at least 35%, conventionally known radical polymerizable monomers may be used, including acrylonitrile, methacrylonitrile, vinyl carbazole, vinyl phthalimide and a copolymer thereof, and their copolymers with a copolymerizable monomer not containing nitrogen, such as an acrylate, a methacrylate, an itaconate, styrene, etc. as the examples. The method for producing the organic polymers in which the particles having a particle diameter of 20 nm or more and 2 μm or less account for a volume fraction of at least 35%, which is an addition polymerization type polymer material, is not particularly limited so long as the particulate precursor composition with a predetermined particle size can be finally obtained. As a preferred production method with which spherical particles are easily obtained, the following methods (A) to (D) are exemplified.

(A) Suspension Polymerization

Suspension polymerization is a method of polymerization by dispersing a monomer into fine particles by vigorously stirring in water and adding an initiator which is soluble in monomer but insoluble in water. A water soluble polymer or a water insoluble inorganic substance may be added as a stabilizer in order to stabilize the dispersion. As a monomer utilizable for suspension polymerization, conventionally known radical polymerizable monomers may be used, including acrylonitrile, methacrylonitrile, an acrylate, a methacrylate, an itaconate, vinyl carbazole, vinyl phthalimide, styrene, etc., as the examples.

(B) Emulsion Polymerization

Emulsion polymerization is a method of polymerization by incorporating a water-insoluble or hardly soluble monomer into a micelle formed with an aqueous solution of a surfactant. As a monomer utilizable for emulsion polymerization, the monomers similar to those mentioned above in method (A), which are polymerizable with conventionally known radical polymerization, are exemplified.

(C) Dispersion Polymerization

Dispersion polymerization is a method to precipitate and take out the polymer as fine particles after polymerization in a solvent to which a monomer is soluble and a polymer is hardly soluble. As a monomer utilizable for dispersion polymerization, the monomers similar to those mentioned above in method (A), which are polymerizable with conventionally known radical polymerization, are exemplified.

(D) Crosslinking Polymerization

This is a method to obtain an organic polymer having a crosslinking structure using a crosslinkable monomer such as divinylbenzene. For example, a method to produce a copolymer by radical polymerization of acrylonitrile and divinylbenzene, as disclosed in J. Phys. Chem. C 2009, 113, 4047-4052, may be suitably utilized.

Since the above-mentioned polymerization methods result in relatively high molecular weight polymers, it is preferable to keep the degree of polymerization low in order to obtain the particulate precursor composition in which the particles having a particle diameter of 20 nm or more and 2 μm or less account for a volume fraction of at least 35%. Accordingly, it is preferable to use a polymerization initiator in an amount larger than usual in the addition polymerization. In the case of a condensation organic polymer, it is preferable to use a dicarboxylic acid component and a diamine component in a non-equimolar ratio or to use a capping monomer. As for the degree of polymerization preferable to obtain the particulate precursor composition in which particles having a particle diameter of 20 nm or more and 2 μm or less account for a volume fraction of at least 35%, for example, in the case of a condensation organic polymer, the preferred intrinsic viscosity at a concentration of 0.5 g/dL and at 30° C. is 0.05 dL/g or more and 1.0 dL/g or less in a dissolved state in an aprotic solvent such as N-methyl-2-pyrrolidone (NMP) or dimethylacetamide (DMAc). The intrinsic viscosity of the hardly soluble polymer such as polyimide herein refers to the intrinsic viscosity of its precursor, polyamic acid. If the intrinsic viscosity is less than 0.05 dL/g, the degree of polymerization is too low to keep the shape of the precursor, resulting in the change of shape upon temperature rising for carbonization, and it will be difficult to prevent fusion of the particles each other. The intrinsic viscosity of 0.1 dL/g or more is more preferable, 0.15 dL/g or more being much more preferable. In order to obtain the particulate precursor composition in which particles having a particle diameter of 20 nm or more and 2 μm or less account for a volume fraction of at least 35%, the intrinsic viscosity of 0.8 dL/g or less is more preferable, 0.5 dL/g or less being much more preferable.

In the case of the above-mentioned addition polymerization organic polymer, the preferred intrinsic viscosity at a concentration of 0.5 g/dL and at 30° C. is 0.2 dL/g or more and 2.0 dL/g or less in a dissolved state in an aprotic solvent such as N-methyl-2-pyrrolidone (NMP) or dimethylacetamide (DMAc) for the similar reason to condensation polymer. The lower limit of the intrinsic viscosity is more preferably 0.3 dL/g or more, and much more preferably 0.4 dL/g or more. The upper limit is more preferably 2.0 dL/g or less, and much more preferably 1.5 dL/g or less.

The fine particles of spherical organic polymer usable as a particulate precursor composition which will be described next can be suitably produced by the above-mentioned polymerization methods. Spheres may also be produced. As a measure of the spherical shape of this particulate precursor composition, the sphericity may be used similarly to the above-mentioned particulate carbon catalyst. The preferred sphericity is also similar to that described regarding the particulate carbon catalyst.

<<Particulate Precursor Composition>>

As mentioned above, the production method of the present invention is a method for producing the above-mentioned particulate carbon catalyst by carbonizing the particulate precursor composition containing nitrogen atoms and an organic polymer, wherein the particles having a particle diameter of 20 nm or more and 2 μm or less account for a volume fraction of at least 35%. In the case where the particulate precursor composition containing nitrogen atoms and an organic polymer is a mixture of an organic polymer and a low molecular weight compound containing nitrogen atoms, a mixture of an organic polymer and a metal compound, or a mixture of an organic polymer, a low molecular weight compound containing nitrogen atoms and a metal compound, etc., the particulate precursor composition suitable for the production method of the present invention can be obtained by having the above-mentioned low molecular weight compound containing nitrogen atoms and a metal compound (sometimes abbreviated as metal compounds hereafter) co-exist upon producing the organic polymer by the above-mentioned polymerization method and having them incorporated in the organic polymer formed. The preferred particulate precursor composition can also be obtained by mixing the solution of the metal compounds and the particles of organic polymer, followed by evaporating the solvent. The particulate precursor composition can also be obtained by making porous particles of the organic polymer, immersing them in the solution of the metal compounds, followed by removing the solvent. Note that the method to impregnate the particulate precursor composition with the metal compound and the type of the metal compound will be described later. In the production method of the present invention, carbonization which will be mentioned later may be performed after chemical modification of the particulate precursor composition. As such chemical modification, stabilization as will be mentioned below, heat treatment of the particulate precursor composition containing polyamic acid as an organic polymer to form the particulate precursor composition containing polyimide, crosslinking by adding a crosslinking agent to increase the degree of polymerization of the organic polymer, and the like may be exemplified.

Especially, if the particulate precursor composition used in the production method of the present invention contains polyacrylonitrile or its copolymer as the organic polymer, it is preferable to perform carbonization after stabilization treatment according to the condition as will be described later.

As mentioned above, the preferred particulate precursor composition is spherical. A spherical particulate carbon catalyst can be obtained by carbonizing the spherical particulate precursor composition.

<<Stabilization>>

The particulate carbon catalyst of the present invention can be produced by carbonizing the above-mentioned particulate precursor composition. If the organic polymer contained in the particulate precursor composition melts upon temperature rising, it is preferable to stabilize the particulate precursor composition beforehand. As the stabilization method, heat treatment in the presence of one or more active gas selected from the group consisting of oxygen, iodine, ozone, nitrogen dioxide, bromine, etc., electron beam irradiation, and the like may be used. The active gas may be used in combination with an inert gas such as a rare gas including argon or nitrogen, and the like. In this case, it is preferable that the concentration of the active gas be 0.5 to 50 vol %, more preferably 5 to 40 vol %, and especially preferably 10 to 30 vol %, relative to 100 vol % of the total of active gas and inert gas. Since the ordinary air contains about 21 vol % of oxygen, stabilization may also be performed under air atmosphere. Stabilization under air atmosphere is preferable because it is not needed to prepare the environmental gas especially.

The stabilization temperature depends on the glass transition temperature, melting point, and the like of the organic polymer used. It is necessary to raise temperature depending on the progress of stabilization reaction and ensure that the reaction proceeds to the extent that the shape change at carbonization is sufficiently small. The stabilization reaction temperature is preferably 100° C. or more, more preferably 150° C. or more, and especially preferably 200° C. or more. The upper limit is preferably 400° C. or less, and more preferably 380° C. or less. The reaction time of stabilization is preferably 5 min to 24 hr, more preferably 10 min to 10 hr, and especially preferably 30 min to 6 hr.

<<Carbonization>>

In the production method of the particulate carbon catalyst of the present invention, the particulate precursor composition containing nitrogen atoms and an organic polymer, wherein the particles having a particle diameter of 20 nm or more and 2 µm or less account for a volume fraction of at least 35%, is carbonized at a temperature of 400 to 1500° C. As for the carbonization method, the temperature should be raised under a condition in which the particle shape of the precursor is not damaged. Higher carbonization temperature is preferable in order to produce the stable and highly electro-conductive catalyst particles in a high carbonization yield. On the other hand, lower carbonization temperature is preferable in order to yield the catalyst with high activity by preventing escaping of nitrogen atoms upon carbonization and keeping nitrogen atoms suitably remaining. From these viewpoints, the carbonization temperature in the production method of the present inventions is preferably 600° C. or more, more preferably 700° C. or more, and further more preferably 750° C. or more. The upper limit of the carbonization temperature is 1200° C. or less, and more preferably 1100° C. or less.

In the case where the particulate precursor composition contains metal atoms, the carbonization temperature is preferably as relatively low as 400° C. to 800° C., more preferably 500 to 700° C., and further more preferably 550 to 700° C., in order to prevent rapid elimination of nitrogen atoms and to produce the particulate carbon catalyst with a high nitrogen content. The carbonization temperature of 400° C. or less is not preferable because the effect of the metal compound for improving the catalyst activity is not sufficient.

The carbonization time is preferably 0.1 hr to 10 hr, and more preferably 0.5 hr to 6 hr. If the carbonization time is less than 0.1 hr, high activation and carbonization of the catalyst may not sufficiently proceed. The heat treatment time of 10 hr or more is not preferable because considerable elimination of nitrogen atoms occurs and only the particulate carbon catalyst with low catalyst activity may be obtained.

It is preferable that the carbonization be performed under an inert atmosphere such as nitrogen and argon or under an atmosphere of ammonia, hydrogen, water vapor, carbon dioxide, and the like.

<<Addition of Metal Atom Component>>

As mentioned above, it is preferable that the particulate precursor composition used as a raw material in the production method of the particulate carbon catalyst of the present invention contains metal atoms.

In order to have the particulate precursor composition contain metal atoms, a metal compound may be added when preparing the particulate precursor composition. Specifically, a method to polymerize in the presence of metal compound in a polymerization solvent to obtain the organic polymer as a component of the particulate precursor composition, a method to dissolve a metal compound in a solvent which does not dissolve the organic polymer and dispersing the organic polymer in that solution after polymerization or stabilization, followed by evaporating the solvent, and the like are exemplified. Any method may be used so long as the metal compound mainly exists near the surface of the organic polymer particles or uniformly exists in the organic polymer particles.

The amount of metal atoms contained in the particulate precursor composition is preferably 0.01 mass % or more and 20 mass % or less, as an amount of the metal atoms relative to the organic polymer, depending on the type of the organic polymer. If the amount of metal atoms is 0.01 mass % or less, effect of the addition of metal atoms for improving the catalyst activity may not be sufficient. The amount of metal atoms to be added is more preferably 0.03 mass % or more, and further more preferably 0.05 mass % or more, as an amount of metal atoms relative to the organic polymer. The amount of metal atoms of 20 mass % or more is not preferable because aggregation of the metal compound or metal atoms between each other occurs during the carbonization reaction and coarse particles of metal atoms and/or metal compound form during the carbonization reaction, preventing contribution to high activation of the catalyst. The amount of metal atoms contained in the particulate precursor composition is more preferably 15 mass % or less, and further more preferably 8 mass % or less, relative to the organic polymer. Note that, as mentioned above, if the organic polymer itself contains metal atoms, it is preferable that the value of the mass of the metal atoms in the organic polymer divided by the mass of the organic polymer minus the mass of the metal atoms falls within the above range.

Although various metal compounds may be used as the compound to have the particulate precursor composition contain metal atoms, at least one kind selected from the group consisting of a transition metal compound such as an iron compound, a cobalt compound, a nickel compound, a copper compound, a tin compound, a manganese compound, a zinc compound, etc. is preferable. As a specific kind of the metal compounds, at least one kind selected from the group consisting of a metal coordination compound such as a metal phthalocyanine, a metal porphyrin, a ferrocene, etc., a metal halide such as a chloride, a bromide, an iodide, etc., a nitrate, a nitrite, an organic acid salt, a sulfate, a sulfite, etc. is preferably exemplified. Among these metal compounds, one soluble in a solvent is preferable for mixing with the organic polymer.

<<Removal of Metal Atoms>>

In the production method of the particulate carbon catalyst of the present invention, it is preferable to remove metal atoms by washing the particulate carbon catalyst after carbonization. Although it is considered that the metal atoms are incorporated in the surface or inside of the particulate carbon catalyst, substantial problems do not occur so long as the metal atoms are not exposed on the surface. In the production method of the present invention, it is preferable to make the amount of the residual metal atoms 0.1 or less, more preferably 0.001 or more and 0.1 or less, as the mass ratio against carbon atoms by washing the particulate carbon catalyst after carbonization.

In the production method of the present invention, as the washing method to remove the metal component, it is preferable to wash using at least one kind of solution selected from the group consisting of an acidic solution such as hydrochloric acid, sulfuric acid, nitric acid, and an aqueous solution thereof, and a basic solution composed of an alkali metal hydroxide or an alkali earth metal hydroxide, which dissolves the metal compound to be added such as iron, cobalt, and nickel. The concentration of the solution to be used is preferably 0.01 mol/L or more, and more preferably 0.1 mol/L or more, as an acid or an alkali. An acid or a base of 0.01 mol/L or less is not preferable because efficient removal of the metal component may be difficult.

As mentioned above, although the time for the washing treatment is not particularly limited so long as the existence ratio of the metal atoms relative to carbon atoms in the particulate carbon catalyst is 0.1 or less in a mass ratio as the metal concentration after washing, it is preferably 1 min to 24 hr, and more preferably 0.5 hr to 20 hr, and further more preferably 1 hr to 15 hr. The washing treatment may be combined with stirring, ultrasonic treatment or heating treatment.

Removal of the metal atoms by the above-mentioned washing and the like may be performed multiple times. The second and subsequent treatment may be performed after activation treatment which will be described below. Removal of the metal atoms and activation treatment may be performed multiple times in combination.

<<Activation Treatment>>

In the method for producing the particulate carbon catalyst of the present invention, the particulate carbon catalyst with higher activity will be preferably obtained by activating the carbonized catalyst by heating at 650 to 1500° C. in an atmosphere of at least one kind of gas selected from the group consisting of ammonia, hydrogen, water vapor and carbon dioxide, after removing metal atoms by washing the particulate carbon catalyst, as mentioned above.

The time for activation treatment is preferably 0.1 hr to 10 hr, and more preferably 0.5 hr to 6 hr. If the activation treatment time is less than 0.1 hr, activation of the catalyst may not proceed sufficiently. If the activation treatment time is more than 10 hr, significant elimination of nitrogen atoms may occur, resulting in the particulate carbon catalyst with low catalyst activity, which is not preferable.

Such activation treatment may be performed multiple times, or may be performed multiple times in combination with the removal treatment of metal atoms, as mentioned above.

<<Dispersion Treatment>>

In the method for producing the particulate carbon catalyst of the present invention, the particulate carbon catalyst may be subjected to dispersion treatment. The dispersion treatment herein refers to a treatment of the particulate carbon catalyst using an ultrasonic apparatus or a ball mill so that the particles forming an aggregate of the particulate carbon catalyst disintegrate and disperse into catalyst particles, provided that the large shape change such as splitting of a spherical particle into hemispheres does not occur. The dispersion treatment is preferably performed after stabilizing or carbonizing the particulate precursor composition or as a step after the activation treatment of the particulate carbon catalyst. The dispersion treatment may be performed, for example, after stabilization and after carbonization, respectively, or may be performed multiple times such as after each activation treatment when the activation treatment is performed multiple times.

<<Usage of Particulate Carbon Catalyst as an Oxygen Reduction Reaction Catalyst>>

The particulate carbon catalyst of the present invention facilitates an efficient progress of the four-electron reduction reaction of oxygen and can be used as an oxygen reduction reaction catalyst for various applications such as an electrode catalyst for a fuel cell and oxygen sensor.

<<Membrane/Electrode Assembly (MEA)>>

A membrane/electrode assembly (MEA) for a fuel cell can be produced by disposing the catalyst electrode of the air electrode using the particulate carbon catalyst of the present invention and the catalyst electrode of the fuel electrode on the either surface of the electrolyte membrane having ion conductivity.

As the above-mentioned electrolyte having ion conductivity, for example, at least one kind selected from the group consisting of electrolytes having proton conductivity including perfluorosulfonic acid electrolyte polymer such as Nafion (registered trade name), Flemion (registered trade name), Aciplex (registered trade name) and Dow membrane, partially fluorinated electrolyte polymer such as sulfonated trifluoropolystyrene, sulfonated bodies of engineering plastics such as polyimide, polyethersulfone, polyetherketone, etc., and hydrocarbon-based polymer electrolyte such as phosphoric acid doped body of polybenzimidazole, as well as electrolytes having $OH^-$ conductivity containing ammonium salt or pyridinium salt in the molecule may be used.

The above-mentioned catalyst electrode of the fuel electrode is composed of the catalyst metal supported on a conductive material with an electrolyte having ionic conductivity. As the catalyst metal, any metal which facilitates oxidation reaction of hydrogen may be used. For example, at least one kind selected from the group consisting of platinum, gold, silver, palladium, iridium, rhodium, ruthenium, or an alloy thereof may be exemplified. Especially platinum is used in most cases, in a state supported on conductive materials such as carbon black, activated carbon, graphite, etc. The amount of the supported catalyst metal is preferably 0.01 to 10 $mg/cm^2$ under the conditions in which the electrode has been shaped.

If the amount of the supported catalyst metal is less than 0.01 $mg/cm^2$, sufficient electricity generation performance is not achieved. If the amount of the loaded catalyst metal is more than 10 $mg/cm^2$, the MEA obtained becomes thick, resulting in low electricity generation efficiency of the fuel cell, which is not preferable.

The above-mentioned catalyst electrode of the air electrode is composed of the above-mentioned particulate carbon catalyst of the present invention and the electrolyte having ionic conductivity. The amount of the supported particulate carbon catalyst of the present invention is preferably 0.01 to 100 $mg/cm^2$, and more preferably 0.1 to 10 $mg/cm^2$ under the conditions in which the electrode has been shaped. If the amount of the supported particulate carbon catalyst is less than 0.1 $mg/cm^2$, sufficient electricity generation performance is not achieved. If the amount of the supported particulate carbon catalyst is more than 100 $mg/cm^2$, the MEA obtained becomes thick, resulting in low electricity generation efficiency of the fuel cell, which is not preferable.

<<Fuel Cell>>

A fuel cell can be produced by using a single cell composed of the membrane/electrode assembly made using the above-mentioned particulate carbon catalyst of the present invention together with a gas diffusion layer (sometimes abbreviated as GDL hereafter) or a separator arranged outside of the assembly, or by using a stack of the multiple single cells intervened by a cooling plate and the like.

The GDL serves to supply hydrogen as a fuel and air to the electrode, to collect electrons generated by the chemical reaction at the electrode, and to keep moisture for the electrolyte membrane. For the GDL, conventionally known materials excellent in gas permeability, acid resistance, electroconductivity and mechanical strength such as carbon paper, carbon cloth, and the like may be used.

The separator shields the passage of fuel and air across the fuel cell stacks and has a fuel flow-channel, which may be made using conventionally known carbon materials or metal materials such as stainless steel.

As the fuel cell having an MEA made using the particulate carbon catalyst of the present invention, a polymer electrolyte fuel cell is especially preferable.

The invention regarding the particulate carbon catalyst, the method for producing the particulate carbon catalyst, and the use of the particulate carbon catalyst as an oxygen reduction reaction catalyst has been described above. However, the present invention may be applied to the particulate carbon catalyst containing boron by replacing "nitrogen" with "boron", for example, in a sentence "content of nitrogen atoms relative to carbon atoms is 0.1 atomic % or more and 10 atomic % or less " and the like.

For example, the particulate precursor composition as a raw material of the particulate carbon catalyst containing boron refers to a mixture of an organic polymer not having boron atoms and a boron-containing low molecular weight compound, a mixture of an organic polymer having a boron atoms and boron-containing low molecular weight compound, a mixture of an organic polymer not having boron atoms and an organic polymer having boron atoms, an organic polymer having boron atoms, etc. The particulate precursor composition may have two kinds or more of the organic polymers or boron-containing low molecular weight compounds, and may contain both of nitrogen atoms and boron atoms. In this case, preferred content of boron or content of the total of nitrogen and boron is similar to those mentioned above regarding nitrogen atoms.

As the above-mentioned boron-containing low molecular weight compound, boric acid, boron oxide, a metal salt of boric acid such as sodium borate, a halogenated boron compound such as boron trifluoride, various organic boron compounds, etc. may be exemplified.

As the above-mentioned organic polymer having boron atoms, conventionally known compound may be used, preferably including vinyl-based boric acid monomers, i.e., a monomer having a carbon to carbon double bond and $BO_3$ structure polymerized alone or with another monomer not containing boron atoms.

As the above-mentioned vinyl-based boric acid monomers, vinyl boric acid, vinylphenyl boric acid, allyl boric acid, and ester derivatives or amide derivatives thereof are exemplified. As the specific example of vinyl-based boric acid monomers, p-vinylphenyl boric acid, o-vinylphenyl boric acid, vinyl boric acid, dibutyl vinyl borate, or allyl boric acid pinacol ester, etc. may be exemplified.

EXAMPLES

Hereinafter, the method of the present invention will be specifically illustrated in more detail referring to the examples. The scope of the present invention is in no way limited by these examples.

1) Measurement of Oxygen Reduction Initiation Potential and Calculation of $H_2O_2$ Generation Rate Measurement of oxygen reduction initiation potential and measurement of current value to calculate the $H_2O_2$ generation rate were performed using a rotary ring-disc electrode apparatus (RDE-1) manufactured by Nikko Keisoku Co.

1-1) Measurement of Oxygen Reduction Initiation Potential

As an index of oxygen reduction reaction activity, the oxygen reduction initiation potential was determined by a linear sweep voltammetry based on a rotary electrode method according to the procedure described below.

In a plastic vial was placed 5 mg of the particulate carbon catalyst obtained by carbonization followed by adding two scoops of glass beads using a spatulas, 50 μL of 5 mass % solution of Nafion (registered trade name) manufactured by Sigma-Aldrich Co. and 150 μL each of distilled water and ethanol. The mixture was then sonicated for 20 min.

A 4 μL aliquot of this slurry was taken, applied on a glassy carbon of the rotary electrode and dried under an atmosphere of saturated water vapor.

Measurement was performed using the dried rotary electrode as the working electrode, a reversible hydrogen electrode (RHE) as the reference electrode, and the carbon fiber as the counter electrode in aqueous solutions of 0.5 mol/L sulfuric acid saturated each with nitrogen and oxygen, respectively, from 1.1 V to 0 V, at a sweep rate of 5 mV/s and a revolution speed of 1500 rpm. The current density at 0.5 V was determined from a voltammogram obtained by subtracting the value of voltammogram in the nitrogen saturated state from the value of voltammogram in the oxygen saturated state. Further, the potential at −2 μA/cm$^2$ was calculated to be the oxygen reduction initiation potential.

1-2) Calculation of $H_2O_2$ Generation Rate

The $H_2O_2$ generation rate M (%) was calculated according to the following equation:

$$M=200 \times IR/\{(N \times ID)+IR\}$$

(wherein ID is an absolute value of the current observed at the rotary disc electrode at each potential, IR is a current value observed at the rotary ring electrode at each potential, and N is a value depending on the structure of the rotary ring disc electrode, which is 0.372256 in this measurement.) from the current value at the ring electrode (the potential of which is maintained at 1.2 V) at the time point when the potential of the disc electrode reached 0.5 V in the measurement of the linear sweep voltammetry according to the rotary electrode method using a rotary ring disc electrode as mentioned above.

2) Observation of Particle Shape of the Particulate Precursor Composition and the Particulate Carbon Catalyst 2-1) Observation of the Particulate Precursor Composition and the Particulate Carbon Catalyst by Scanning Electron Microscope Observation of particle shape and photography were performed using a scanning electron microscope (SEM) VE-9800 manufactured by Keyence Corporation. From the SEM image obtained, 10 particles at the topmost surface which were not hidden by other particles were manually selected using an image analysis software (A-zoh-kun, registered trade name) supplied by Asahi Kasei Engineering Corporation. Surface area (S), circumferential length (L), maximum length and minimum length were determined. Surface irregularity of 9.5 nm or less was ignored in the determination of the circumferential length and surface area.

For each of the particles for which the surface area (S) etc. were determined, sphericity T was calculated according to the following equation:

$$\text{Sphericity } T=4\pi S/L^2$$

(wherein L is the circumferential length of the particle on the image, S is the surface area of the particle and π is circumference ratio.) and the average value was assumed to be the sphericity of the particulate precursor composition or the particulate carbon catalyst.

In some of the reference examples and examples, the average particle diameter was also calculated based on the maximum diameter of the particle determined from the SEM image as mentioned above.

2-2) Measurement of Particle Size Distribution of the Particulate Precursor Composition The particle size distribution of the particulate precursor composition was measured using SALD-7100 manufactured by Shimadzu Corporation under the condition of the refractive index of 1.6-0.10 i and the volume fraction and the average particle diameter of the particles having a diameter of 20 nm or more and 1 μm or less was determined.

2-3) Measurement of Particle Size Distribution of the Particulate Carbon Catalyst The solvent for measurement was prepared by adding a surfactant aqueous solution containing sodium alkylether sulfate ester and 21 mass % of fatty acid alkanol amide to an aqueous solution containing 50 vol % ethanol. To this solvent was added the particulate carbon catalyst and the resultant mixture was dispersed by sonication for 5 min using SONIFER 250 manufactured by Branson Ultrasonics Corporation. The particle size distribution of the particulate carbon catalyst was measured for the dispersion obtained using SALD-7100 manufactured by Shimadzu Corporation under the condition of the refractive index of 2.0-0.20 i and the volume fractions of the particles having a diameter of 20 nm or more and 2 μm or less and the particles having a diameter of 20 nm or more and those having 1 μm or less were determined.

2-4) Elemental Analysis of (Particulate) Carbon Catalyst

The measurement was performed using PE 2400 Series II CHNS/O analyzer manufactured by PerkinElmer Inc. A 2 mg aliquot of the (particulate) carbon catalyst was weighed as a sample and heated. The decomposition gas obtained was reduced and $CO_2$, $H_2O$ and $N_2$ generated were quantitated to determine the elemental composition of carbon, hydrogen and nitrogen, from which the ratio of nitrogen atoms to carbon atoms (nitrogen/carbon atomic ratio or sometimes abbreviated as N/C ratio) in percentage was calculated.

3) Composition Analysis of Transition Metals in Particulate Carbon Catalyst

Since it is obvious that the transition metal substantially detected by the elemental analysis of the particulate carbon catalyst produced is only iron atoms which originate from the iron compound added upon preparation, the mass ratio of iron atoms relative to carbon atoms in the carbon catalyst was determined from the result of the elemental analysis using an electron probe microanalyzer (EPMA, JXA-8100 manufactured by JEOL Ltd.). The elemental analysis by EPMA was performed for a sample obtained by pelletizing the powder of the particulate carbon catalyst obtained without using a binder.

4) Viscosity Measurement of Polymer

The relative viscosity (a value of the viscosity of solution divided by the viscosity of solvent: $\eta_{rel}$) at 30° C. of the sample solution at a polymer concentration of 0.5 g/dL prepared using N-methyl-2-pyrrolidone (NMP) or dimethylacetamide (DMAc) as a solvent was obtained. The intrinsic viscosity was calculated based on the relative viscosity according to the following equation:

$$\eta_{inh}=(ln\eta_{rel})/C$$

(wherein $\eta_{inh}$ represents the intrinsic viscosity, ln is natural logarithm, $\eta_{rel}$ and C represent the relative viscosity and the polymer concentration in the solution, respectively.)

Reference Example 1

Preparation of Polyamic Acid Particles

In an eggplant-shaped flask, 4.36 parts by mass of pyromellitic dianhydride was dissolved in 95 parts by mass of acetone to obtain an acetone solution of pyromellitic dianhydride. In another eggplant-shaped flask, 4.005 g of 4,4'-diaminodiphenyl ether was dissolved in 127 parts by mass of acetone to obtain an acetone solution of 4,4'-diaminodiphenyl ether. To the acetone solution of 4,4'-diaminodiphenyl ether was added the acetone solution of pyromellitic dianhydride and 16 parts by mass of acetone was added to initiate the reaction. After 40 min, associated with progress of reaction, pale yellow particles precipitated and a dispersion of polyamic acid was obtained. The dispersion was diluted with acetone and then dispersed. Measurement of the particle size distribution showed that the volume fraction of the particles having a particle diameter of 20 nm or more and 2 μm or less was 100%. The volume fraction of the particles having a particle diameter of 20 nm or more and 1 μm or less was also 100%. The dispersion obtained was filtered using a membrane filter having a pore diameter of 1 μm, and the powder was isolated and dried under reduced pressure for 3 hr at 60° C. to yield 7.56 parts by mass of polyamic acid particles. The intrinsic viscosity of the sample solution of 0.5 g/dL polyamic acid in the DMAc solution was 0.206 dL/g.

The SEM image of the polyamic acid particles obtained is shown in FIG. 1. The average sphericity of 10 polyamic acid particles determined from the SEM image was 0.88 and the average particle diameter was 0.456 μm (standard deviation 0.022 μm).

Reference Example 2

Preparation of Polyimide-iron (II) Chloride Particulate Precursor Composition

In a solution of 0.128 parts by mass of iron (II) chloride dissolved in 47 parts by mass of acetone, 2.0 parts by mass of the polyamic acid particles obtained in Reference Example 1 was added and dispersed. After stirring for 7 hr, acetone was removed to obtain particles composed of polyamic acid fine particles and iron (II) chloride. The particles were heat treated for 3 hr at 300° C. to facilitate the ring closing reaction, yielding the spherical particulate precursor composition composed of polyimide and iron (II) chloride.

Reference Example 3

Preparation of Polyimide-iron Phthalocyanine Particulate Precursor Composition

To a dispersion of 0.575 parts by mass of iron phthalocyanine added in 47 parts by mass of acetone, 2.0 parts by mass of the polyamic acid particles obtained in Reference Example 1 was added and dispersed. By stirring for 7 hr and performing the similar operation to Reference Example 2, the spherical particulate precursor composition composed of polyimide and iron phthalocyanine was obtained.

Reference Example 4

Preparation of a Block of Polyamic Acid

In an eggplant-shaped flask, 4.36 parts by mass of pyromellitic dianhydride and 4.00 parts by mass of 4,4'-diaminodiphenyl ether were dissolved in 123 parts by mass of N-methylpyrrolidone (NMP). The solution was stirred for 7 hr at room temperature to obtain a viscous reaction solution. The solution obtained was poured to methanol to subject to reprecipitation. The precipitate was subjected to suction filtration and dried for 12 hr at 80° C. under reduced pressure to obtain the block of polyamic acid. The intrinsic viscosity of the sample solution of 0.5 g/dL polyamic acid in N,N-dimethylacetamide (DMAc) solution was 0.377 dL/g. SEM and particle size distribution measurements were not possible because the particle size was too large.

Reference Example 5

Preparation of Polyimide-iron (II) Chloride Composition

Using the block of polyamic acid obtained in Reference Example 4 and performing the similar operation to Reference Example 2, the block composition composed of polyimide and iron (II) chloride was obtained.

Reference Example 6

Preparation of Polyimide-iron Phthalocyanine Composition

Using the block of polyamic acid obtained in Reference Example 4 and performing the similar operation to Reference Example 3, the block composition composed of polyimide and iron phthalocyanine was obtained.

Example 1

Preparation of Particulate Carbon Catalyst using the Polyimide-iron (II) Chloride Particulate Precursor Composition The polyimide-iron (II) chloride particulate precursor composition obtained in Reference Example 2 was heat treated (carbonized) for 5 hr at 600° C. under nitrogen atmosphere, followed by removal of the metal by washing with concentrated hydrochloric acid to obtain the particulate carbon catalyst. The particulate carbon catalyst obtained was further heat treated (activated) for 1 hr at 800° C. under ammonia stream, followed by removal of the metal by washing with concentrated hydrochloric acid to obtain the spherical particulate carbon catalyst. Dispersion treatment of the particulate carbon catalyst using a ball mill was performed prior to the second heat treatment (activation).

Figure 2:
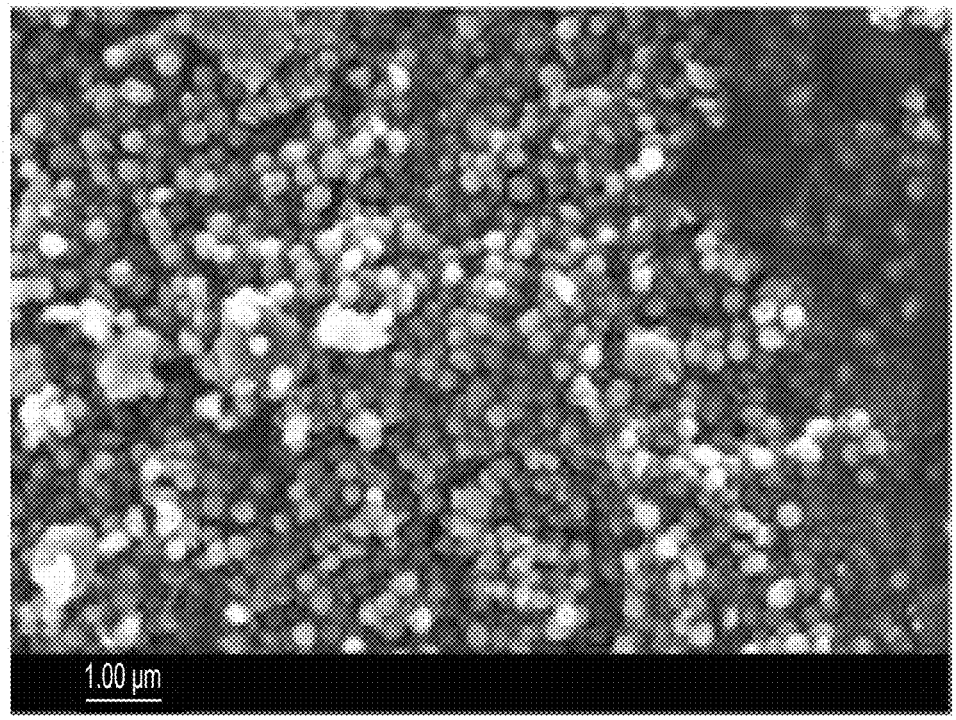
FIG. 2 is an SEM image (photograph) of particulate carbon catalyst obtained in Example 1.

The SEM image of the particulate carbon catalyst obtained is shown in FIG. 2. The average diameter of 10 particles of the particulate carbon catalyst determined from the SEM image was 0.373 μm (standard deviation 0.032 μm) and the sphericity was 0.89. Measurement of the particle size distribution showed that the volume fraction of the particles having a particle diameter of 20 nm or more and 1 μm or less was 61.3%. The nitrogen/carbon atomic ratio (N/C ratio) of this particulate carbon catalyst was 5.9 atomic % and the content of iron atoms was $0.99 \times 10^{-2}$ as the mass ratio against carbon atoms. The oxygen reduction initiation potential of the particulate carbon catalyst obtained is shown in Table 1 together with other data.

Example 2

Preparation of Particulate Carbon Catalyst using the Polyimide-iron Phthalocyanine Particulate Precursor Composition Using the polyimide-iron phthalocyanine particulate precursor composition obtained in Reference Example 3 and performing the similar operation to Example 1, the spherical particulate carbon catalyst was obtained. Upon preparation of the particulate carbon catalyst, the particulate carbonized product was dispersed using a ball mill after the heat treatment.

Figure 3:
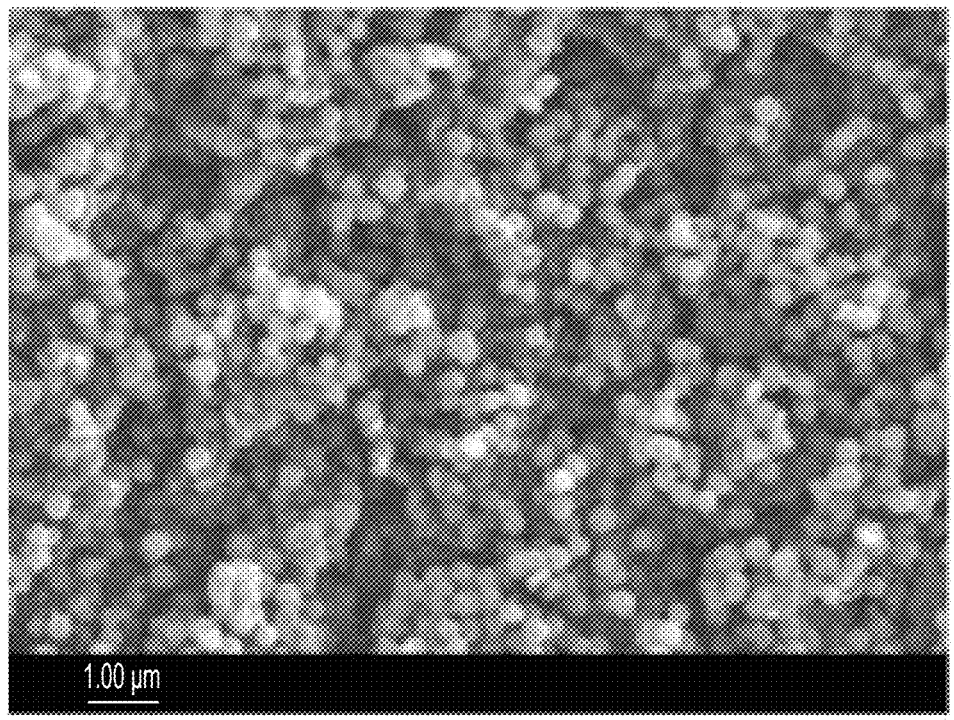
FIG. 3 is an SEM image (photograph) of particulate carbon catalyst obtained in Example 2.

The SEM image of the particulate carbon catalyst obtained is shown in FIG. 3. The average diameter of 10 particles of the particulate carbon catalyst determined from the SEM image was 0.385 μm (standard deviation 0.033 μm) and the sphericity was 0.88. Measurement of the particle size distribution showed that the volume fraction of the particles having a particle diameter of 20 nm or more and 1 μm or less was 68.7%. The nitrogen/carbon atomic ratio (N/C ratio) of this particulate carbon catalyst was 4.4 atomic % and the content of iron atoms was $0.45 \times 10^{-2}$ as the mass ratio against carbon atoms. The oxygen reduction initiation potential of the particulate carbon catalyst obtained is shown in Table 1 together with other data.

Comparative Example 1

Preparation of Carbon Catalyst using the Polyimide-iron (II) Chloride Composition Using the polyimide-iron (II) chloride composition obtained in Reference Example 5 and performing the similar operation to Example 1, the block of the carbonized product was obtained. The carbonized product obtained was pulverized using a ball mill to obtain the carbon catalyst.

Figure 4:
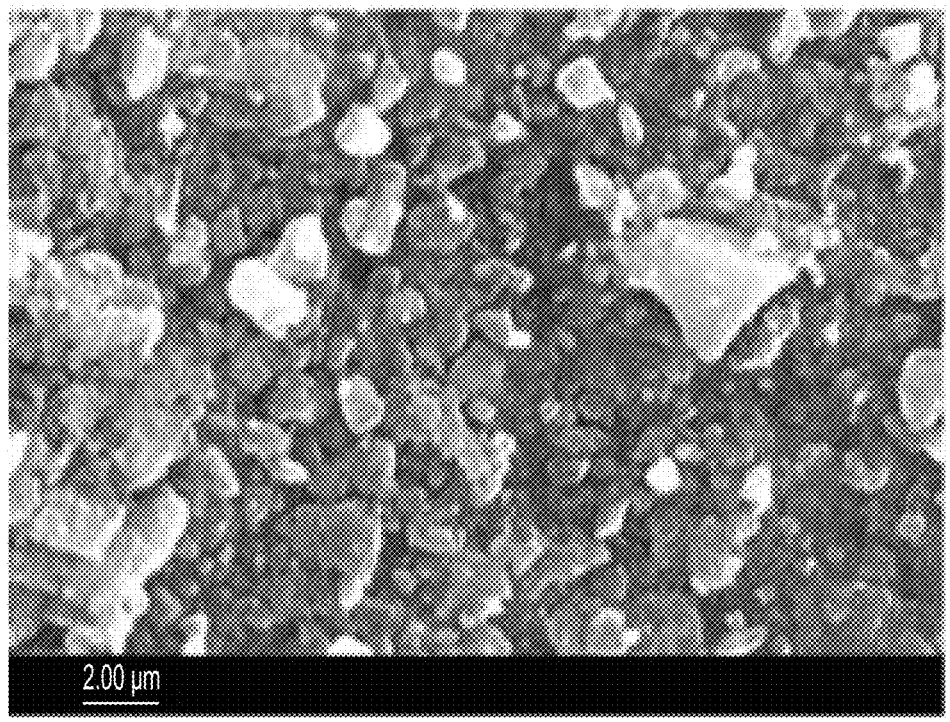
FIG. 4 is an SEM image (photograph) of carbon catalyst obtained in Comparative Example 1.

The SEM image of the carbon catalyst obtained is shown in FIG. 4. The average diameter of 10 particles of the carbon catalyst determined from the SEM image was 2.565 μm (standard deviation 1.109 μm) and the sphericity was 0.63. Measurement of the particle size distribution showed that the volume fraction of the particles having a particle diameter of 20 nm or more and 1 μm or less was 41.6%. The nitrogen/carbon atomic ratio (N/C ratio) of this carbon catalyst was 6.2 atomic % and the content of iron atoms was $1.16 \times 10^{-2}$ as the mass ratio against carbon atoms. The oxygen reduction initiation potential of the carbon catalyst obtained is shown in Table 1 together with other data.

Comparative Example 2

Figure 5:
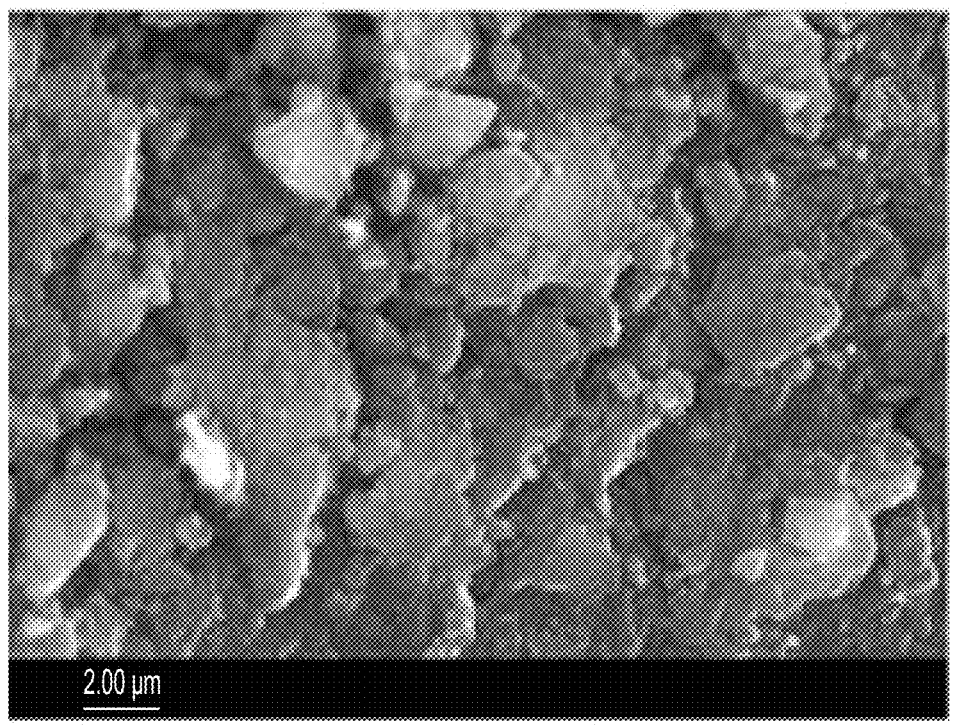
FIG. 5 is an SEM image (photograph) of carbon catalyst obtained in Comparative Example 2.

Preparation of Carbon Catalyst using the Polyimide-iron Phthalocyanine Composition Using the polyimide-iron phthalocyanine composition obtained in Reference Example 6 and performing the similar operation to Example 2, the block of the carbonized product was obtained. The carbonized product obtained was pulverized using a ball mill to obtain the carbon catalyst. The SEM image of the carbon catalyst obtained is shown in FIG. 5. The average diameter of 10 particles of the carbon catalyst determined from the SEM image was 3.836 μm (standard deviation 1.653 μm) and the sphericity was 0.58. Measurement of the particle size distribution showed that the volume fraction of the particles having a particle diameter of 20 nm or more and 1 μm or less was 40.1%. The nitrogen/carbon atomic ratio (N/C ratio) of this carbon catalyst was 5.7 atomic % and the content of iron atoms was $2.51 \times 10^{-2}$ as the mass ratio against carbon atoms. The oxygen reduction initiation potential of the carbon catalyst obtained is shown in Table 1 together with other data.

Example 3

Preparation of Particulate Carbon Catalyst using the Polyimide-iron (II) Chloride Particulate Precursor Composition The polyimide-iron (II) chloride particulate precursor composition obtained in Reference Example 2 was heat treated (carbonized) for 1 hr at 800° C. under nitrogen atmosphere to obtain the spherical particulate carbon catalyst. Dispersion treatment of the particulate carbon catalyst using a ball mill was also performed after the heat treatment.

Figure 6:
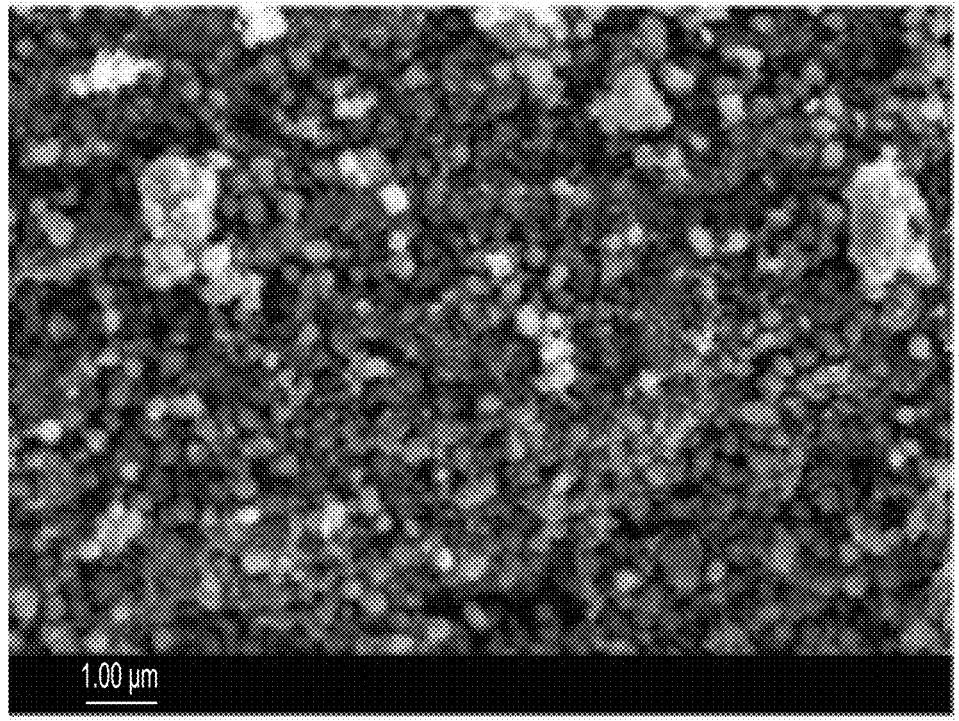
FIG. 6 is an SEM image (photograph) of particulate carbon catalyst obtained in Example 3.

The SEM image of the particulate carbon catalyst obtained is shown in FIG. 6. The average diameter of 10 particles of the particulate carbon catalyst determined from the SEM image was 0.317 μm (standard deviation 0.023 μm) and the sphericity was 0.88. Measurement of the particle size distribution showed that the volume fraction of the particles having a particle diameter of 20 nm or more and 1 μm or less was 67.6%. The nitrogen/carbon atomic ratio (N/C ratio) of this particulate carbon catalyst was 2.4 atomic % and the content of iron atoms was $4.30 \times 10^{-2}$ as the mass ratio against carbon atoms. The oxygen reduction initiation potential of the particulate carbon catalyst obtained is shown in Table 1 together with other data.

Comparative Example 3

Preparation of Carbon Catalyst using the Polyimide Particles-iron (II) Chloride Composition Using the polyimide-iron (II) chloride composition obtained in Reference Example 5 and performing the similar operation to Example 3, the block of the carbonized product was obtained. The carbonized product obtained was pulverized using a ball mill to obtain the carbon catalyst.

Figure 7:
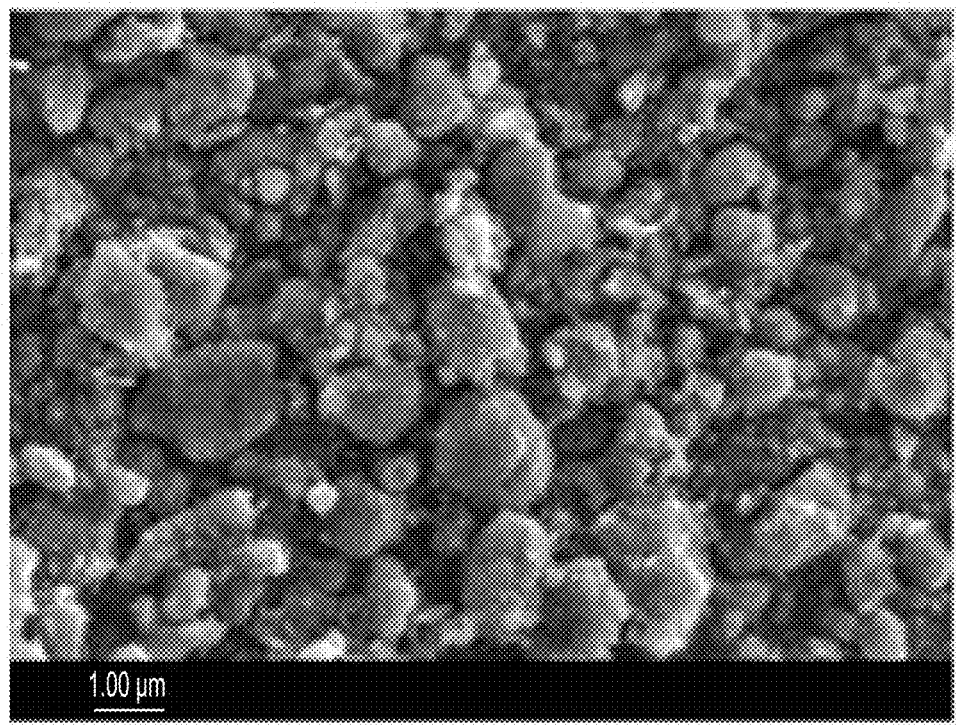
FIG. 7 is an SEM image (photograph) of carbon catalyst obtained in Comparative Example 3.

The SEM image of the carbon catalyst obtained is shown in FIG. 7. The average diameter of 10 particles of the carbon catalyst determined from the SEM image was 1.463 μm (standard deviation 0.397 μm) and the sphericity was 0.66. Measurement of the particle size distribution showed that the volume fraction of the particles having a particle diameter of 20 nm or more and 1 μm or less was 32.4%. The nitrogen/carbon atomic ratio (N/C ratio) of this particulate carbon catalyst was 2.4 atomic % and the content of iron atoms was $8.27 \times 10^{-2}$ as the mass ratio against carbon atoms. The oxygen reduction initiation potential of the carbon catalyst obtained is shown in Table 1 together with other data.

Reference Example 7

Preparation of Polybenzimidazopyrrolone-iron (II) Chloride Particulate Composition In an eggplant-shaped flask, 1.63 parts by mass of pyromellitic dianhydride was dissolved in 118 parts by mass of acetone to obtain an acetone solution of pyromellitic dianhydride. In another eggplant-shaped flask, 1.03 parts by mass of triethylamine and 1.60 parts by mass of 4,4'-diaminobenzidine was dissolved in 47 parts by mass of DMAc to obtain a DMAc solution of 4,4'-diaminobenzidine. To the DMAc solution of 4,4'-diaminobenzidine was added the acetone solution of pyromellitic dianhydride and 39 parts by mass of acetone was added to initiate the reaction. After 60 min, associated with progress of reaction, pale yellow particles precipitated, which was filtered using a membrane filter with a pore diameter of 1 μm. The powder was isolated and dried under reduced pressure for 3 hr at 60° C., followed by heat treatment for 3 hr at 300° C. to subject to the ring closing reaction, yielding the spherical polybenzimidazopyrrolone particles. To 47 parts by mass of acetone were added 2.44 parts by mass of polybenzimidazopyrrolone obtained and 0.17 parts by mass of iron (II) chloride and stirred for 7 hr. Acetone was distilled off under reduced pressure using an evaporator to obtain the spherical polybenzimidazopyrrolone-iron (II) chloride particulate precursor composition.

Example 4

Figure 8:
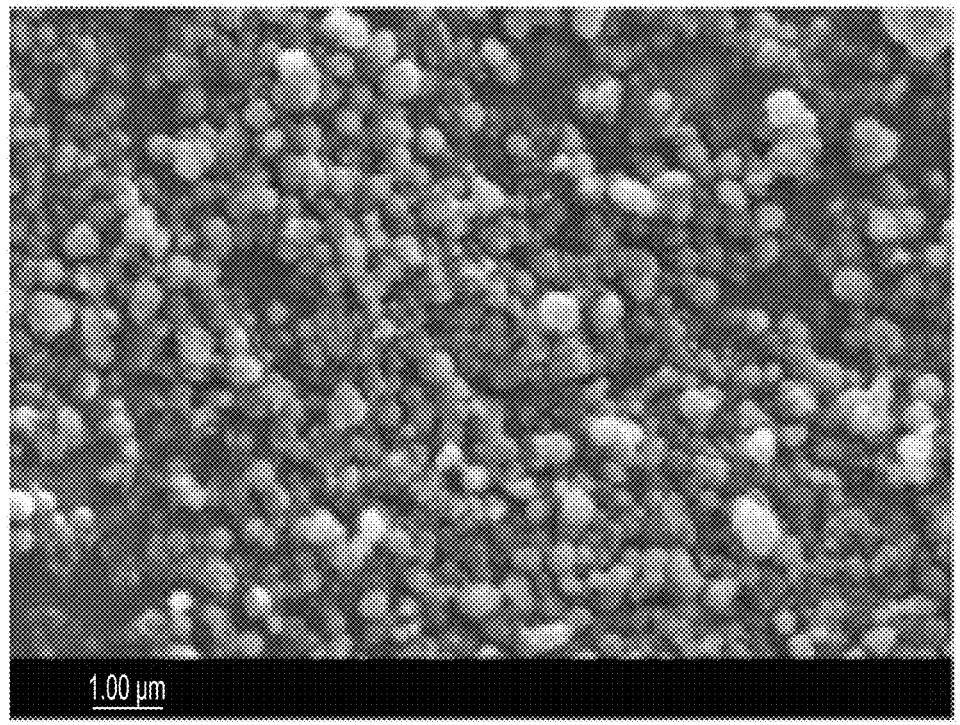
FIG. 8 is an SEM image (photograph) of particulate carbon catalyst obtained in Example 4.

Preparation of Particulate Carbon Catalyst using the Polybenzimidazopyrrolone-iron (II) Chloride Particulate Composition Using the polybenzimidazopyrrolone-iron (II) chloride composition particles obtained in Reference Example 7 and performing the similar operation to Example 1, the spherical particulate carbon catalyst was obtained. The SEM image of the particulate carbon catalyst obtained is shown in FIG. 8. The average diameter of 10 particles of the particulate carbon catalyst determined from the SEM image was 0.451 μm (standard deviation 0.052 μm) and the sphericity was 0.88. Measurement of the particle size distribution showed that the volume fraction of the particles having a particle diameter of 20 nm or more and 1 μm or less was 92.6%. The nitrogen/carbon atomic ratio (N/C ratio) of this particulate carbon catalyst was 5.1 atomic %. The oxygen reduction initiation potential of the particulate carbon catalyst obtained is shown in Table 1 together with other data.

Reference Example 8

Preparation of Spherical Polyacrylonitrile Particles

To a flask was added 216 parts by mass of toluene under nitrogen stream, and 56.35 parts by mass of acrylonitrile was added and dissolved. To this solution was added 0.75 parts by mass of 2,2'-azobisisobutyronitrile dissolved in 43 parts by mass of toluene to initiate the reaction by raising the temperature to 60° C. under stirring. After the reaction for 3 hr at 60° C., 89 parts by mass of tetrahydrofuran was added to the reaction mixture. The product was filtered using a filter having a pore diameter of 0.2 μm. The material on the filter was washed with tetrahydrofuran and filtered again, followed by drying under reduced pressure to obtain the spherical polyacrylonitrile particles.

The intrinsic viscosity measured for an NMP solution containing 0.5 g/dL of polyacrylonitrile was 1.054 dL/g.

Figure 9:
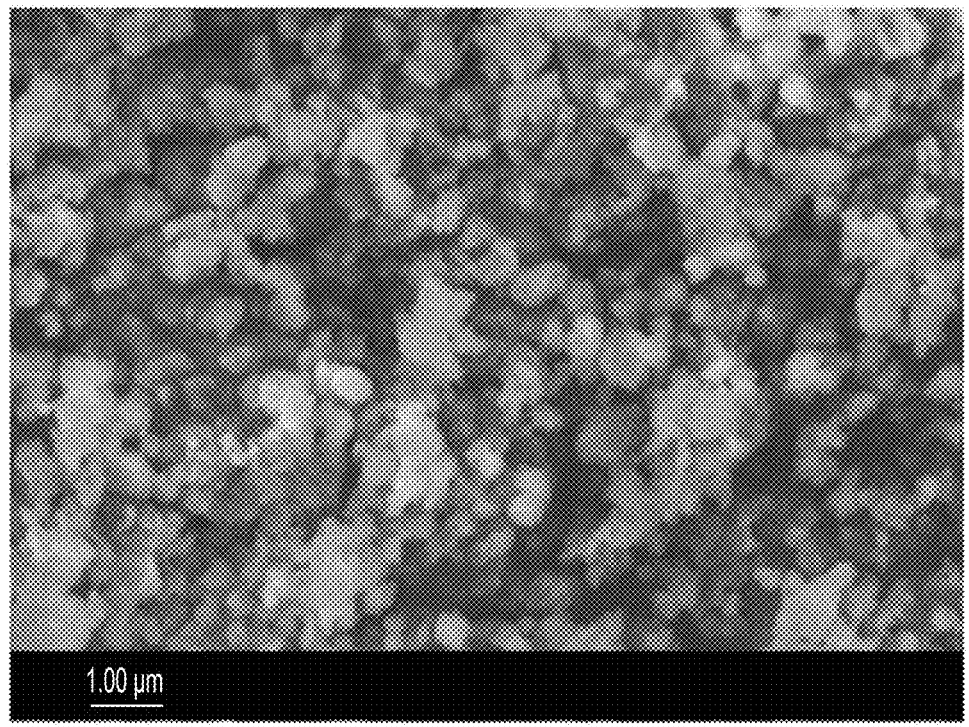
FIG. 9 is an SEM image (photograph) of polyacrylonitrile particles obtained in Reference Example 8.

The SEM image of the spherical polyacrylonitrile particles obtained is shown in FIG. 9. The average diameter of 10 particles of the carbon catalyst determined from the SEM image was 0.447 μm (standard deviation 0.109 μm) and the sphericity was 0.87. The polyacrylonitrile particles obtained were added to an aqueous solution containing 50 vol % of ethanol and sonicated for 5 min using SONIFER 250 manufactured by Branson Ultrasonics Corporation to form a dispersion. Measurement of the particle size distribution for the dispersion obtained showed that the volume fraction of the particles having a particle diameter of 20 nm or more and 2 μm or less was 71.1%.

Example 5

The spherical polyacrylonitrile particles obtained in Reference Example 8 were gradually heated from 190° C. and heat treated for 1 hr at 230° C. in air to obtain the stabilized spherical polyacrylonitrile particles.

In a solution of 0.0285 parts by mass of iron (II) chloride hydrate (hydration number 3.49) manufactured by Alfa Aesar Co. in 222 parts by mass of tetrahydrofuran (THF), 8.0 parts by mass of the stabilized polyacrylonitrile particles mentioned above were dispersed. After the dispersion treatment, THF was distilled off under reduced pressure using an evaporator to obtain the spherical particulate precursor composition of the stabilized polyacrylonitrile-iron (II) chloride hydrate. The particulate precursor composition was heat treated for 5 hr at 600° C. under nitrogen stream, dispersed in a mortar, heat treated (activation treatment) for 1 hr at 800° C. under ammonia stream, dispersed in a mortar, heat treated again (activation treatment) for 1 hr at 950° C. under ammonia stream, and dispersed using a ball mill to obtain the spherical particulate carbon catalyst. The oxygen reduction initiation potential of the particulate carbon catalyst obtained is shown in Table 1 together with other data.

Figure 10:
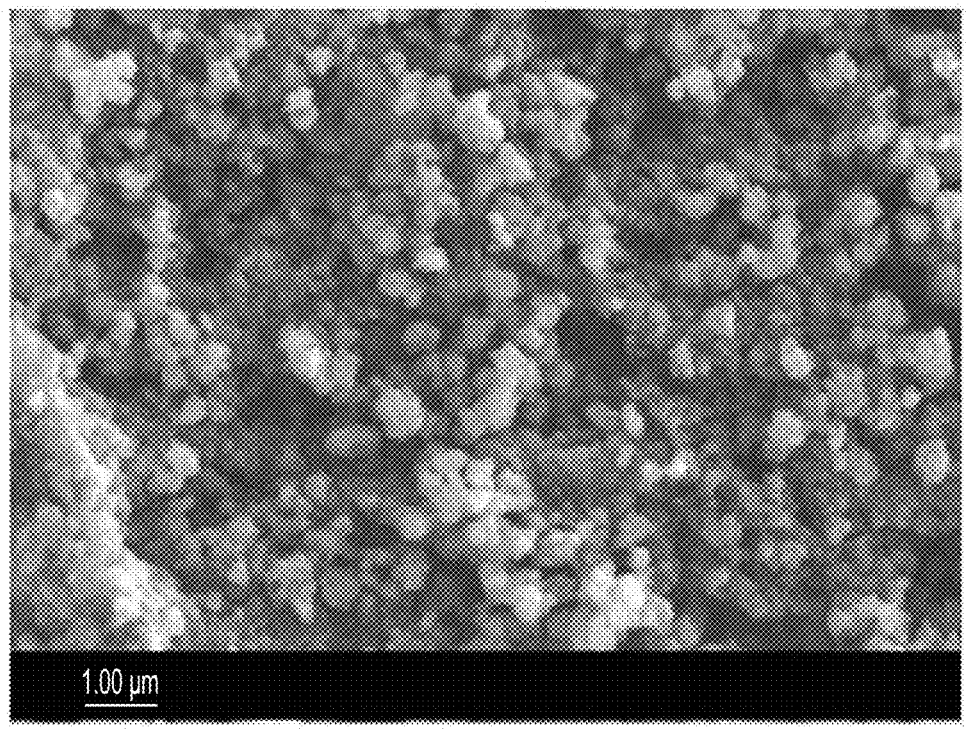
FIG. 10 is an SEM image (photograph) of particulate carbon catalyst obtained in Example 5.

The SEM image of the particulate carbon catalyst obtained is shown in FIG. 10. The average diameter of 10 particles of the particulate carbon catalyst determined from the SEM image was 0.422 μm (standard deviation 0.097 μm) and the sphericity was 0.86. Measurement of the particle size distribution showed that the volume fraction of the particles having a particle diameter of 20 nm or more and 1 μm or less was 87.8%. The nitrogen/carbon atomic ratio (N/C ratio) of this particulate carbon catalyst was 7.5 atomic %. The oxygen reduction initiation potential of the particulate carbon catalyst obtained is shown in Table 1 together with other data.

Reference Example 9

Figure 11:
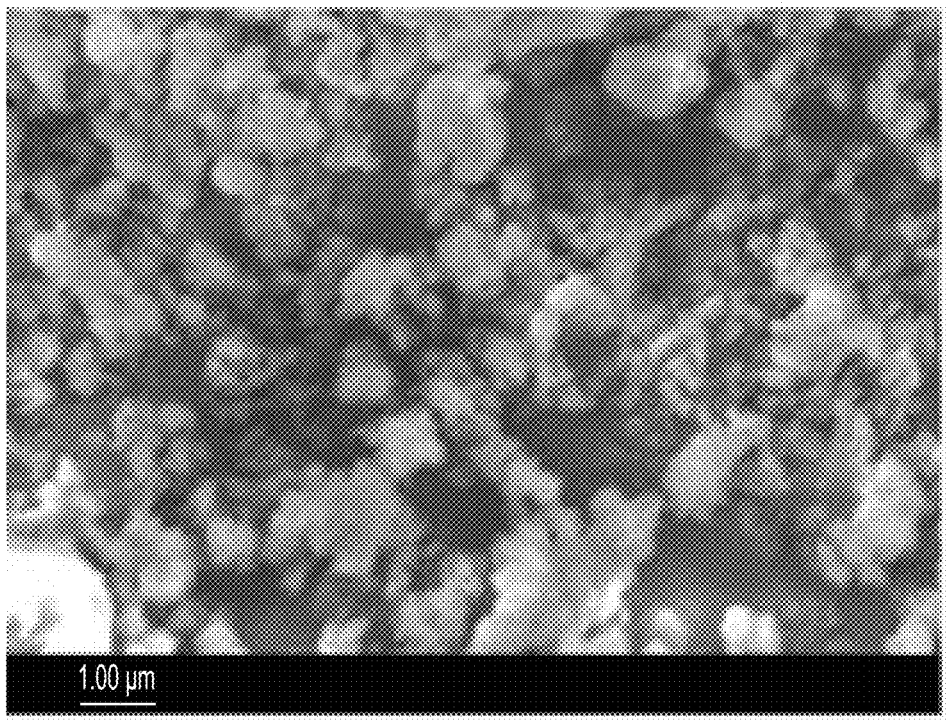
FIG. 11 is an SEM image (photograph) of polyacrylonitrile particles of Reference Example 9.

The SEM image of polyacrylonitrile (Mw 150,000, intrinsic viscosity 1.885 dL/g) manufactured by Polyscience, Inc. is shown in FIG. 11. The average diameter of 10 particles of polyacrylonitrile determined from the SEM image was 1.215 μm (standard deviation 0.440 μm) and the sphericity was 0.70. Measurement of the particle size distribution for the dispersed solution obtained by of the addition of the above-mentioned polyacrylonitrile to an aqueous solution containing 50 vol % of ethanol followed by sonication for 5 min using SONIFER 250 manufactured by Branson Ultrasonics Corporation showed that the volume fraction of the particles having a particle diameter of 20 nm or more and 2 μm or less was 27.4%.

Comparative Example 4

Using polyacrylonitrile (Mw 150,000, intrinsic viscosity 1.885 dL/g) manufactured by Polyscience, Inc. in Reference Example 9 and performing the similar operation to Example 5, the carbon catalyst was obtained.

Figure 12:
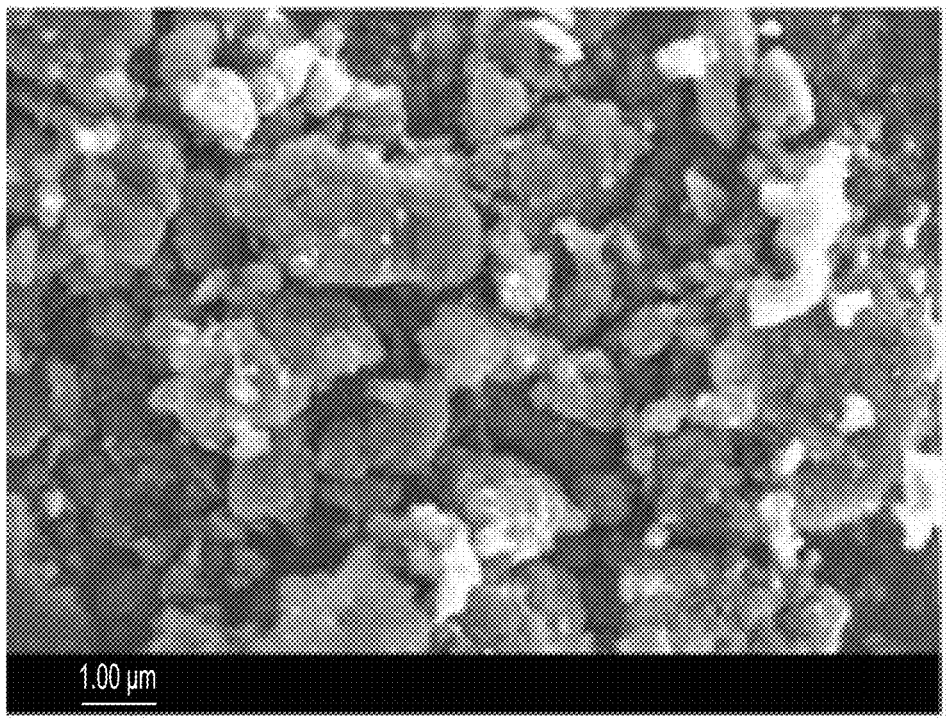
FIG. 12 is an SEM image (photograph) of carbon catalyst obtained in Comparative Example 4.

The SEM image of the particulate carbon catalyst obtained is shown in FIG. 12. The average diameter of 10 particles of the particulate carbon catalyst determined from the SEM image was 1.992 μm (standard deviation 0.900 μm) and the sphericity was 0.64. Measurement of the particle size distribution showed that the volume fraction of the particles having a particle diameter of 20 nm or more and 1 μm or less was 19.6%. The nitrogen/carbon atomic ratio (N/C ratio) of this particulate carbon catalyst was 4.3 atomic %. The oxygen reduction initiation potential of the particulate carbon catalyst obtained is shown in Table 1 together with other data.

Comparative Example 5

In a solution of 0.0285 parts by mass of iron (II) chloride hydrate (hydration number 3.49) manufactured by Alfa Aesar Co. in 222 parts by mass of tetrahydrofuran (THF), 8.0 parts by mass of the spherical polyacrylonitrile particles obtained in Reference Example 8 were dispersed. THF was distilled off under reduced pressure using an evaporator to obtain the spherical particulate precursor composition of the polyacrylonitrile-iron (II) chloride hydrate. The particulate precursor composition was heat treated for 5 hr at 600° C. under nitrogen stream without stabilization treatment to obtain the carbonized body of the molten product. The carbonized body was heat treated (activation treatment) for 1 hr at 800° C. under ammonia stream, heat treated again (activation treatment) for 1 hr under ammonia stream, and pulverized using a ball mill to obtain the carbon catalyst. The oxygen reduction initiation potential of the carbon catalyst obtained is shown in Table 1 together with other data.

Figure 13:
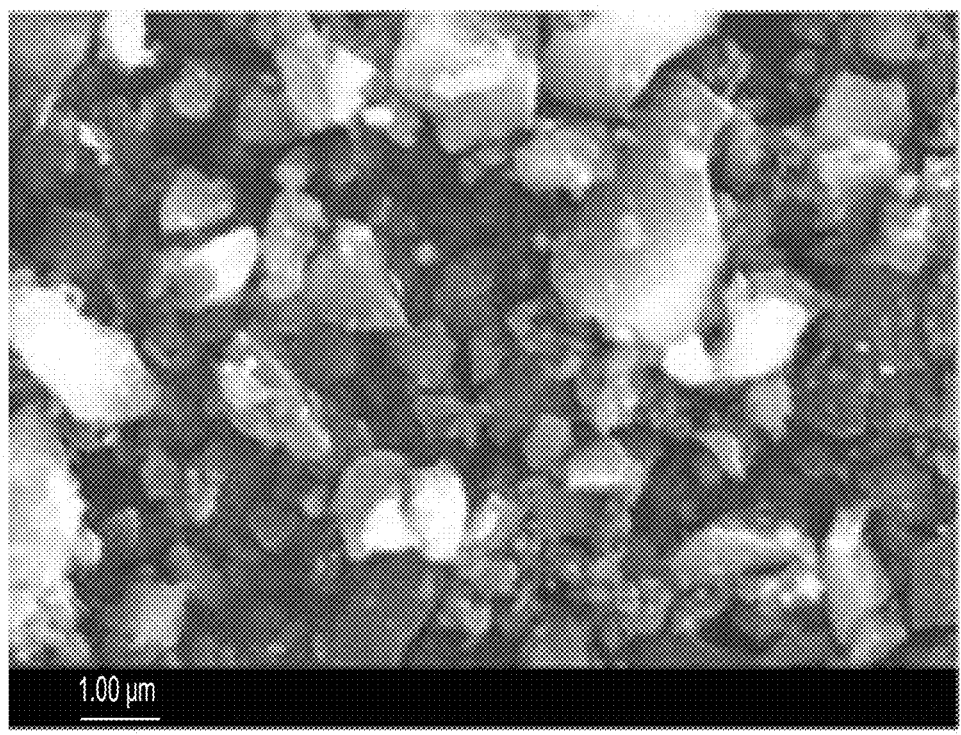
FIG. 13 is an SEM image (photograph) of particulate carbon catalyst obtained in Comparative Example 5.

The SEM image of the particulate carbon catalyst obtained is shown in FIG. 13. The average diameter of 10 particles of the particulate carbon catalyst determined from the SEM image was 1.751 μm (standard deviation 0.637 μm) and the sphericity was 0.61. Measurement of the particle size distribution showed that the volume fraction of the particles having a particle diameter of 20 nm or more and 1 μm or less was 20.4%. The nitrogen/carbon atomic ratio (N/C ratio) of this particulate carbon catalyst was 4.9 atomic %. The oxygen reduction initiation potential of the particulate carbon catalyst obtained is shown in Table 1 together with other data.

TABLE 1

| | Oxygen reduction initiation potential (V) | Current value at 0.5 V (mA/cm$^2$) | H$_2$O$_2$ generation rate at 0.5 V (%) | Sphericity (—) | Volume fraction of particle diameter 20 nm to 1 μm (%) |
|---|---|---|---|---|---|
| Example 1 | 0.93 | −4.03 | 11.3 | 0.89 | 61.3 |
| Example 2 | 0.93 | −3.61 | 12.1 | 0.88 | 68.7 |
| Comparative Example 1 | 0.92 | −3.56 | 16.0 | 0.63 | 41.6 |
| Comparative Example 2 | 0.94 | −3.21 | 15.9 | 0.58 | 40.1 |
| Example 3 | 0.86 | −1.85 | 23.4 | 0.88 | 67.6 |
| Comparative Example 3 | 0.85 | −1.12 | 34.2 | 0.66 | 32.4 |
| Example 4 | 0.93 | −3.70 | 11.7 | 0.88 | 92.6 |
| Example5 | 0.93 | −4.46 | 10.8 | 0.86 | 87.8 |
| Comparative Example 4 | 0.93 | −4.03 | 14.5 | 0.64 | 19.6 |
| Comparative Example 5 | 0.93 | −3.87 | 14.3 | 0.61 | 20.4 |

INDUSTRIAL APPLICABILITY

The particulate carbon catalyst of the present invention is suitable as a catalyst for the electrode of a polymer electrolyte fuel cell.

The invention claimed is:
1. A particulate carbon catalyst in which particles having a particle diameter of 20 nm or more and 1 μm or less account for a volume fraction of at least 55% and a content of nitrogen atoms relative to carbon atoms in the particulate carbon catalyst is 0.5 atomic % or more and 8 atomic % or less; wherein the particles contain metal atoms in amount of 0.0045 or more and 0.0430 or less in mass ratio relative to carbon atoms in the particulate carbon catalyst, wherein the metal atoms are at least one kind selected from the group consisting of iron, cobalt, nickel, copper, tin, manganese, and zinc atoms;
wherein the particles are spherical;
wherein the average value of the sphericity T defined by the following equation for randomly selected 10 or more particles is 0.80 or more and 0.95 or less:

Sphericity $T=4\pi S/L^2$ wherein L is the circumferential length of the particle on a planar image of particles, S is the area of the particle on the image, and π is circumference ratio.
2. A method for producing the particulate carbon catalyst according to claim 1, comprising carbonizing a particulate precursor composition containing nitrogen atoms and an organic polymer at 400 to 1500° C., wherein particles having a particle diameter of 20 nm or more and 1 μm or less account for a volume fraction of at least 55%, wherein the particulate precursor composition contains metal atoms, and wherein the metal atoms are at least one kind selected from the group consisting of iron, cobalt, nickel, copper, tin, manganese, and zinc atoms.
3. The method for producing the particulate carbon catalyst according to claim 2, wherein the organic polymer contained in the particulate precursor composition is polyacrylonitrile and carbonization is performed after stabilizing the particulate precursor composition.
4. The method for producing the particulate carbon catalyst according to claim 2, wherein the organic polymer contained in the particulate precursor composition is at least one kind selected from the group consisting of a polyamide, a polyamic acid, a polyimide, a polyamideimide, a polyimide ester, a polyamide ester, a polyazole, and a polybenzimidazopyrrolone.
5. The method for producing the particulate carbon catalyst according to claim 2, wherein the particulate precursor composition comprises at least one kind of metal atom selected from the group consisting of iron, cobalt, nickel, and copper.
6. The method for producing the particulate carbon catalyst according to claim 2, wherein the particulate precursor composition is spherical particles and the particulate carbon catalyst formed by carbonization is also spherical.
7. The method for producing the particulate carbon catalyst according to claim 6, wherein the average value of the sphericity T defined by the following equation for randomly selected 10 or more particles from each of the particulate precursor composition and the particulate carbon catalyst is 0.80 or more and 0.95 or less:

Sphericity $T=4\pi S/L^2$ wherein L is circumferential length of the particle on a planar image of particles, S is area of the particle on the image, and it is circumference ratio.
8. The method for producing the particulate carbon catalyst according to claim 2, wherein the metal atoms are removed by further washing the particulate carbon catalyst after carbonization.
9. The method for producing the particulate carbon catalyst according to claim 8, wherein the carbon catalyst is activated by further heating at 650 to 1500° C. under an atmosphere of at least one kind of gas selected from the group consisting of ammonia, hydrogen, water vapor and carbon dioxide, after removing the metal atoms by washing the particulate carbon catalyst.

10. A method of using a particulate carbon catalyst according to claim 1, comprising conducting a reduction reaction of oxygen with the particulate carbon catalyst as an oxygen reduction reaction catalyst.

\* \* \* \* \*